United States Patent
Chamberlain

(10) Patent No.: US 7,377,535 B2
(45) Date of Patent: May 27, 2008

(54) BICYCLE FRAME

(75) Inventor: Jason L. Chamberlain, Morgan Hill, CA (US)

(73) Assignee: Specialized Bicycle Components, Inc., Morgan Hill, CA (US)

(*) Notice: Subject to any disclaimer, the term of this patent is extended or adjusted under 35 U.S.C. 154(b) by 137 days.

(21) Appl. No.: 10/983,421

(22) Filed: Nov. 8, 2004

(65) Prior Publication Data

US 2005/0046142 A1 Mar. 3, 2005

Related U.S. Application Data

(60) Provisional application No. 60/623,615, filed on Oct. 29, 2004.

(51) Int. Cl.
*B62K 19/02* (2006.01)
*B62K 19/30* (2006.01)

(52) U.S. Cl. .............. 280/284; 280/259; 280/281.1; 280/283; 280/249; 280/274; 280/275

(58) Field of Classification Search ............ 280/249, 280/259, 281.1, 283, 284, 274, 275
See application file for complete search history.

(56) References Cited

U.S. PATENT DOCUMENTS

| | | | | |
|---|---|---|---|---|
| 3,889,975 A | * | 6/1975 | Falconi ............... | 280/281.1 |
| 4,437,679 A | * | 3/1984 | Campagnolo ........ | 280/281.1 |
| 5,435,584 A | * | 7/1995 | Buell .................. | 280/284 |
| 5,628,524 A | * | 5/1997 | Klassen et al. ...... | 280/284 |
| 5,725,227 A | * | 3/1998 | Mayer ................. | 280/284 |
| 5,842,711 A | * | 12/1998 | Legerot ............... | 280/281.1 |
| 5,979,924 A | * | 11/1999 | D'Aluisio et al. ... | 280/261 |
| 6,099,010 A | * | 8/2000 | Busby ................. | 280/284 |
| 6,742,796 B2 | * | 6/2004 | Ho et al. ............. | 280/281.1 |
| 6,854,753 B2 | * | 2/2005 | Turner ................. | 280/284 |
| 6,880,847 B2 | * | 4/2005 | Chamberlain et al. | 280/284 |

FOREIGN PATENT DOCUMENTS

| | | |
|---|---|---|
| FR | 2450145 A | 3/1979 |
| GB | 500909 A | 1/1938 |
| GB | 513749 A | 4/1938 |

OTHER PUBLICATIONS

Pending U.S. Patent Application Specification in 21 pages, Inventors Jason L. Chamberlain and Brandon Dale Sloan, U.S. Appl. No. 10/656,922, filed Sep. 4, 2003.
Ellsworth Internet Materials, http://www.ellsworthbikes.com/bikes/id/index.cfm dated Nov. 3, 2004 in 4 pages.
Patrick Brady, *Asphalt Magazine*, vol. One, No. 4: 78-81, "Torchbearers: Kirk Frameworks."
English translation of Patent No. FR2450145A document.

\* cited by examiner

*Primary Examiner*—Lesley D. Morris
*Assistant Examiner*—Marlon Arce-Diaz
(74) *Attorney, Agent, or Firm*—Knobbe, Martens, Olson & Bear, LLP

(57) ABSTRACT

A bicycle frame assembly including a down tube and a monolithic down tube support. The down tube support preferably defines a pocket configured to receive an end portion of the down tube such that the tube support overlaps at least a portion of a side surface of the end portion of the down tube. In one embodiment, a weld bead joins both of the tube support and the down tube. Preferably, the down tube support also defines an opening configured to receive and support a pedal crank assembly relative to the bicycle frame. Furthermore, preferably the down tube support also includes a pivot mount portion configured to rotatably support a sub-frame of the frame assembly or a rear shock absorber.

43 Claims, 16 Drawing Sheets

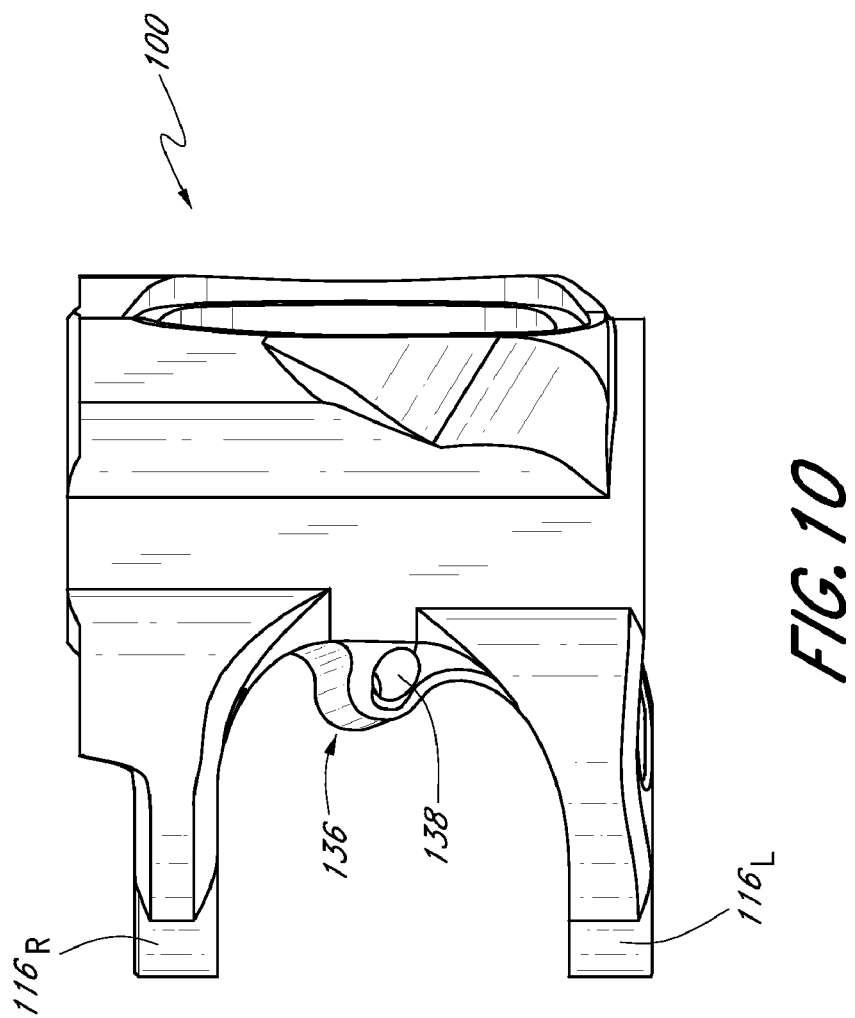

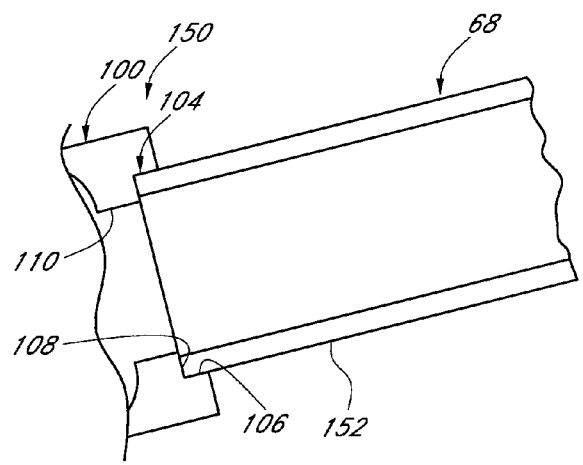
FIG. 12A
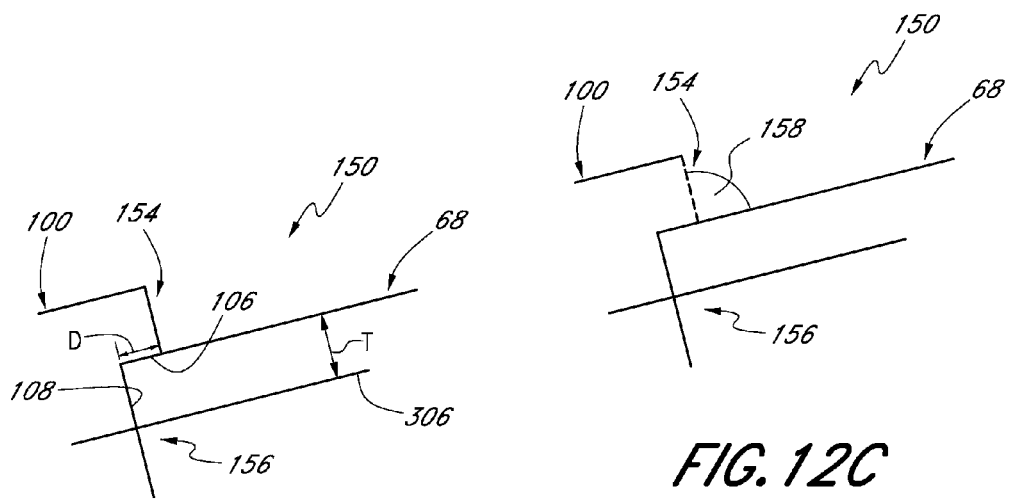
FIG. 12B
FIG. 12C

BICYCLE FRAME

RELATED APPLICATIONS

This application is related to and claims priority from U.S. Provisional Patent Application No. 60/623,615, entitled BICYCLE FRAME, and filed on Oct. 29, 2004.

INCORPORATION BY REFERENCE

U.S. Provisional Patent Application No. 60/623,615, entitled BICYCLE FRAME, and filed on Oct. 29, 2004 is hereby incorporated by reference in its entirety and made a part of this specification.

BACKGROUND OF THE INVENTION

1. Field of the Invention

The present invention generally relates to bicycles. More specifically, the present invention relates to a bicycle frame including an improved support for a down tube of the bicycle frame and a method for constructing such a bicycle frame.

2. Description of the Related Art

One type of bicycle frame is an assembly of multiple components assembled together into a desired shape. The individual components of such a bicycle frame may comprise metal tubes that are cut, shaped and joined together, typically by a welding process. In general, a bicycle frame is configured to support a seat assembly, a pedal crank assembly, a rear wheel and a steering assembly. The steering assembly typically includes a handlebar, front fork and front wheel coupled to one another and permitted to rotate relative to the bicycle frame. If the associated bicycle is intended for off road use, the bicycle frame may provide rear wheel suspension. Such a frame may include a main frame and sub-frame pivotally connected to the main frame. The sub-frame supports the rear wheel and a shock absorber may be connected between the main frame and the sub-frame to influence relative movement between the main frame and the sub-frame.

A central, lower portion of the bicycle frame typically defines a laterally extending opening configured to support the pedal crank assembly. Typically, the opening is defined by a tube referred to as a bottom bracket shell. The opening of the bottom bracket shell is configured to receive and support a bottom bracket assembly, which includes one or more bearings to rotatably support the pedal crank assembly.

In addition to supporting the pedal crank assembly, the bottom bracket shell is often used to connect a down tube of the main frame to a seat tube of the main frame. Typically, the ends of the down tube and seat tube are shaped, or mitered, to mirror an external surface of the bottom bracket shell. The mitered ends of the down tube and seat tube are butted against the external surface of the bottom bracket shell and welded in place. This type of connection between the tubes and the bottom bracket shell requires precision fixturing of the down tube and seat tube relative to the bottom bracket shell to ensure proper alignment of the frame, once the tubes are welded to the bottom bracket shell. The seat tube and down tube must be precisely positioned along the bottom bracket shell in a lateral direction and must be positioned radially along the bottom bracket shell at a desired angle from one another. Furthermore, if the bottom bracket shell is a cylindrical tube, as is common, the surface area available to receive and support the seat tube and down tube is limited. As a result, the diameters of the seat tube and down tube may be limited by the size of the bottom bracket shell, which generally is sized to receive an industry-standard bottom bracket assembly. In addition, the simple butted joint between the down tube and the bottom bracket shell often results in a welded connection that exhibits undesirable strength characteristics.

SUMMARY OF THE INVENTION

Preferred embodiments of the present bicycle frame include a down tube support defining a recess, or pocket, configured to receive a lower end portion of a down tube of the bicycle frame. The down tube support preferably also defines a lateral opening configured to receive and support a pedal crank assembly. Certain preferred embodiments of the down tube support may also include a pivot mount configured to support a sub-frame of the bicycle frame or a rear shock absorber. The down tube support preferably is a monolithic structure and, in one arrangement, is produced by a manufacturing process that includes a forging step. The pocket that receives the end portion of the down tube assists in aligning the down tube relative to the support to simplify the process of joining frame components to one another. Advantageously, such an arrangement reduces the time required to manufacture the bicycle frame which, in turn, reduces manufacturing costs and may ultimately reduce the cost of the bicycle frame to the consumer.

A preferred embodiment is a bicycle frame that includes a down tube and a monolithic tube support. The tube support defines an opening configured to receive and support a pedal crank assembly relative to the bicycle frame. The tube support defines a pocket configured to receive an end portion of the down tube such that the tube support overlaps at least a portion of a side surface of the end portion of the down tube. A weld bead joins the tube support and the outward facing surface of the down tube.

Another preferred embodiment is a bicycle frame including a down tube having an end portion defining a non-circular cross-sectional shape. A monolithic down tube support defines an opening configured to receive and support a pedal crank assembly. The tube support also defines a pocket configured to receive the end portion of the down tube. The pocket defines a non-circular shape that substantially corresponds to the non-circular shape of the end portion of the down tube. The pocket is configured to overlap at least a portion of a side surface of the end portion of the down tube.

Yet another preferred embodiment is a bicycle frame including a main frame comprising a down tube and a sub-frame moveable relative to the main frame and configured to carry a rear wheel. The main frame and the sub-frame are configured to operably support a shock absorber therebetween to influence movement of the sub-frame relative to the main frame. A monolithic down tube support defines a pocket configured to receive and end portion of the down tube such that the tube support overlaps at least a portion of a side surface of the end portion of the down tube. The tube support includes a mount portion defining a pivot axis and configured to support one of the sub-frame and the shock absorber for rotation about the pivot axis.

Still another preferred embodiment is a bicycle frame including a down tube and a monolithic tube support. The tube support includes an opening defining a crank axis and being configured to receive and support a pedal crank assembly relative to the bicycle frame. The tube support defines a pocket configured to receive an end portion of the down tube such that the tube support overlaps at least a portion of a side surface of the end portion of the down tube. The tube support includes a tube extending substantially in a radial direction relative to the crank axis. The tube is configured to support a front derailleur at a spaced location from the crank axis.

A preferred embodiment is a bicycle frame including a down tube and a monolithic down tube support defining a surface configured to abut an end surface of the down tube. The down tube support definines a lateral opening configured to receive and support a pedal crank assembly. The down tube support is configured to substantially close off an open end of the down tube when the pedal crank assembly is received within the opening.

A preferred embodiment is a bicycle frame including a main frame and a sub-frame. The main frame includes a down tube. The sub-frame is movable relative to the main frame and the main frame and the sub-frame are configured to operably support a shock absorber therebetween. A monolithic down tube support defines a surface configured to abut an end surface of the down tube. The down tube support also includes a lateral opening configured to receive and support a pedal crank assembly for rotation about a crank axis. An axis of the down tube is offset from the crank axis. Further one end of the shock absorber is connected to a portion of the main frame other than the down tube support.

A preferred embodiment is a bicycle frame including a down tube and a monolithic down tube support defining a surface configured to abut an end surface of the down tube. A portion of the down tube abutting the down tube support defines a connection axis and defines a height between an upper surface and a lower surface. The down tube support includes a lateral opening configured to receive and support a pedal crank assembly for rotation about a crank axis. The connection axis is spaced below the crank axis. Further, the height of the down tube is greater than a diameter of the opening.

BRIEF DESCRIPTION OF THE DRAWINGS

These and other features, aspects and advantages of the present bicycle frame are described below with reference to drawings of preferred embodiments, which are intended to illustrate, but not to limit, the present invention. The drawings contain 15 figures.

FIG. 10 is a bottom view of the down tube support of FIG. 4.

FIG. 11A is a cross-sectional view of the intersection between the down tube and the bottom bracket shell. FIG. 11B is an enlarged view of the intersection of a wall of the down tube and a wall of a bottom bracket shell prior to welding. FIG. 11C illustrates the intersection of the wall of the down tube and the wall of the bottom bracket shell of FIG. 11B after welding.

FIGS. 12A through 12E illustrate an intersection between the down tube support and the down tube of the bicycle frame assembly of FIG. 2. FIG. 12A is a cross-sectional view of an intersection between the down tube support and the down tube. FIG. 12B is an enlarged view of the intersection between the down tube support and a wall of the down tube prior to welding. FIG. 12C is an illustration of the intersection between the down tube support and a wall of the down tube of FIG. 12B after welding. FIG. 12D is another enlarged view of a connection between the down tube and the down tube support. FIG. 12E is a cross-sectional view of a lower end portion of the down tube.

DETAILED DESCRIPTION OF THE PREFERRED EMBODIMENT

Figure 1:
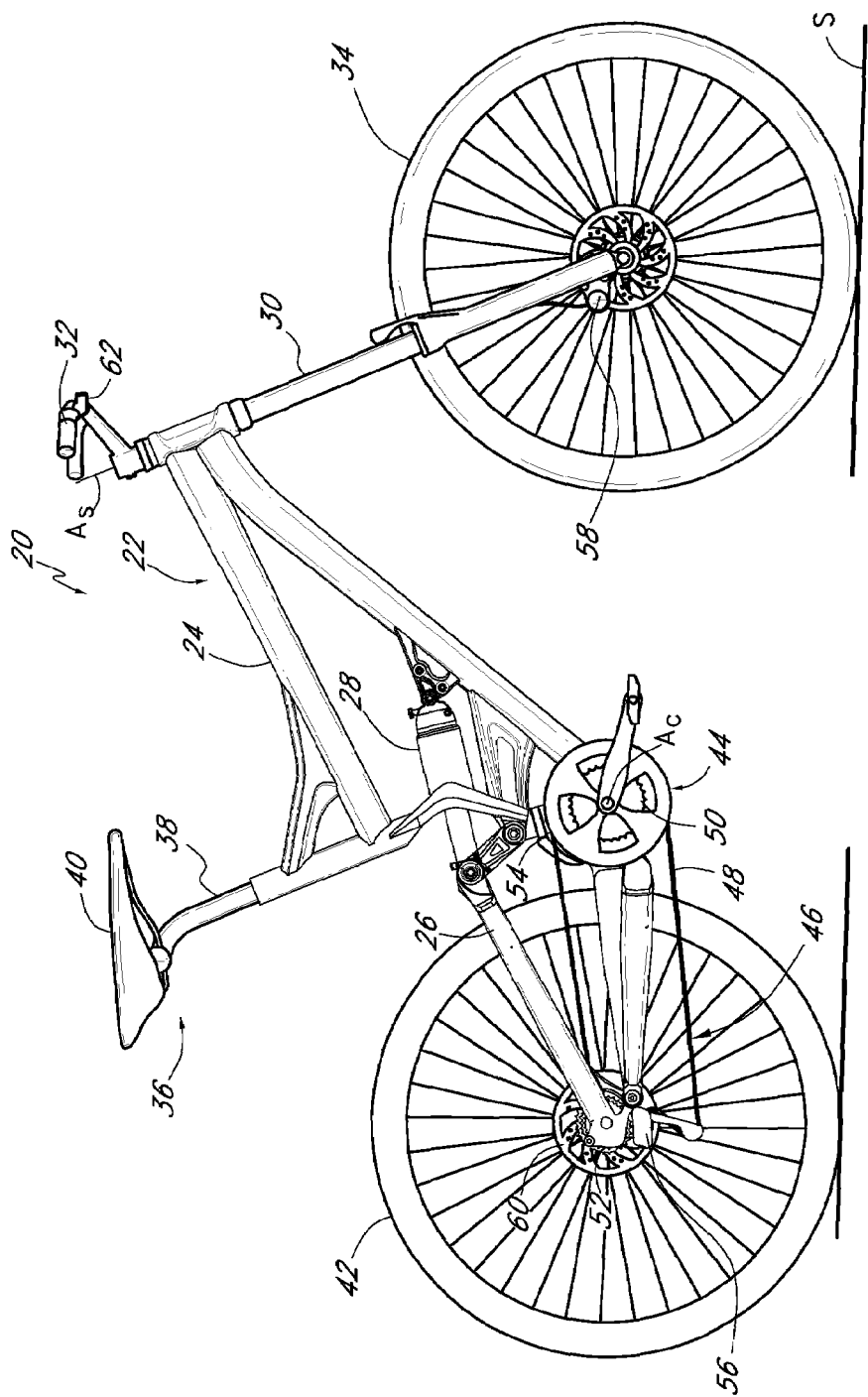
FIG. 1 is an elevational view of a bicycle including a frame assembly having certain features, aspects and advantages of the present invention.

FIG. 1 is a bicycle 20 including a frame assembly 22 having certain features, aspects and advantages of the present invention. The bicycle frame assembly 22 includes a main frame 24 and a sub-frame 26. The sub-frame 26 is pivotally supported relative to the main frame 24. A shock absorber 28 extends between the main frame 24 and the sub-frame 26 and is configured to influence relative movement therebetween. Preferably, the shock absorber 28 provides both a spring force and a damping force. The spring force tends to lengthen the shock absorber 28 and the damping force attenuates both compression and extension (or rebound) movement of the shock absorber 28.

A forward end of the frame assembly 22 preferably supports a front suspension fork 30 for rotation about a steering axis $A_S$. A handlebar assembly 32 is connected to the upper end of the suspension fork 30. A front wheel 34 of the bicycle 20 is rotatably supported by a lower end of the front suspension fork 30. A central, upper portion of the frame assembly 22 supports a bicycle seat assembly 36, including a seat post 38 and a saddle 40. A rear wheel 42 is rotatably supported by the sub-frame 26 of the frame assembly 22. Thus, the rear wheel 42 is moveable, along with the sub-frame 26, relative to the main frame 24.

A lower, central portion of the frame assembly 22 supports a pedal crank assembly 44 for rotation about a crank axis $A_C$. In the illustrated arrangement, the pedal crank assembly 44 is drivingly coupled to the rear wheel 42 by a chain drive transmission 46. The chain drive transmission 46 preferably includes an endless drive train 48 looped around one of a plurality of variably-sized gears, or chain rings 50, of the pedal crank assembly 44 and one of a plurality of variably-sized gears, or cogs 52, coupled to the rear wheel 42. A front derailleur 54 is configured to move the drive chain 48 between the plurality of front chain rings 50. A rear derailleur 56 is configured to move the drive chain 48 between the plurality of rear cogs 52. By moving the drive chain 48 between varying combinations of the chain rings 50 and cogs 52, a desired gear ratio may be selected from the plurality of available ratios. Although such a multi-speed chain drive arrangement is preferred for its efficiency and reliability, other suitable drive train arrangements may also be used.

A front brake assembly 58 is configured to apply a braking force to the front wheel 34. Similarly, a rear brake assembly 60 is configured to apply a braking force to the rear wheel 42. Although disc-type brakes are shown, other suitable types of braking systems may also be used, such as cantilever-type brakes, for example. Preferably, rider controls 62 are provided on the handlebar assembly 32 to permit a rider of the bicycle 20 to control the front and rear derailleurs 54, 56 and front and rear brake assemblies 58, 60.

Figure 2:
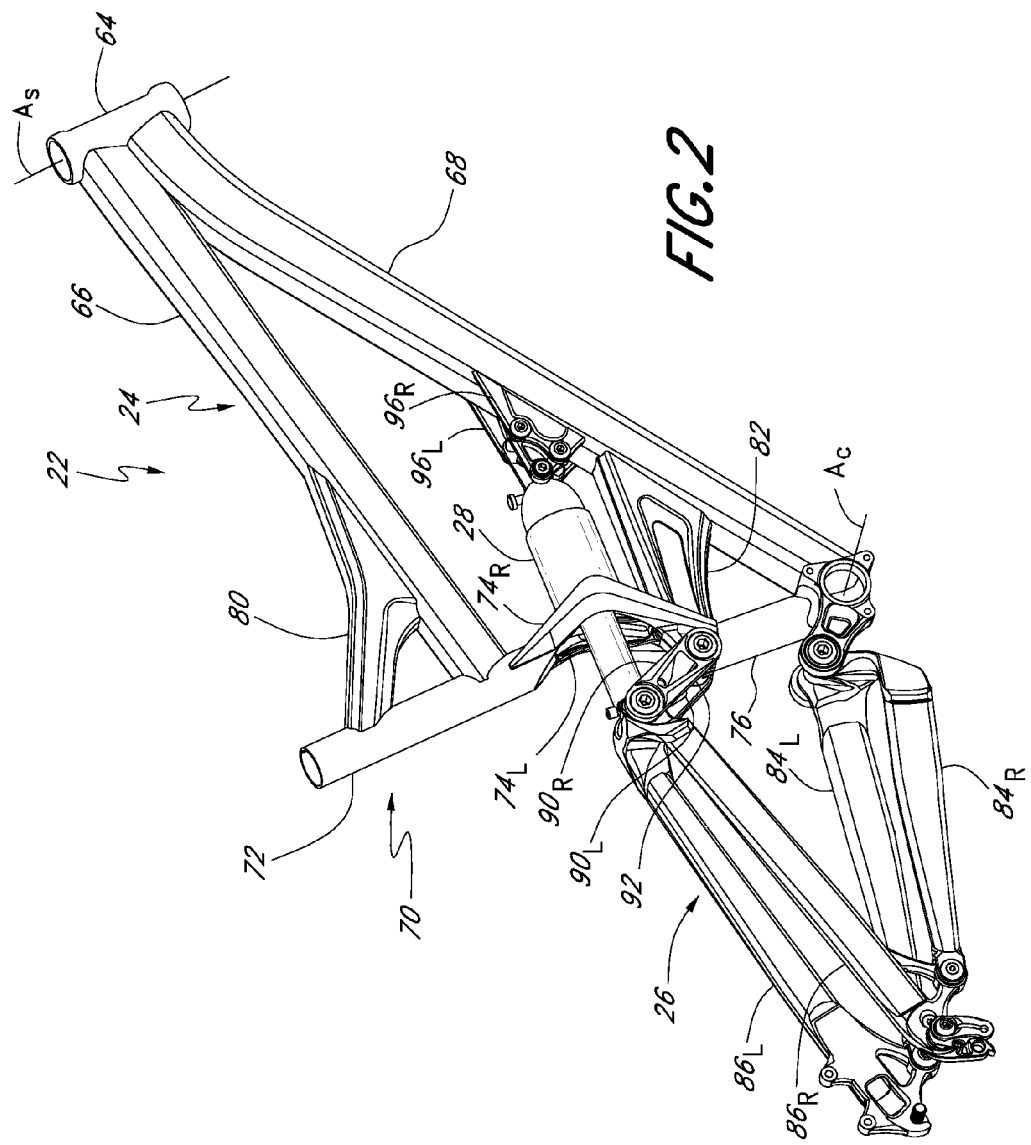
FIG. 2 is a perspective view of the frame assembly of the bicycle of FIG. 1 with the components removed.
Figure 3:
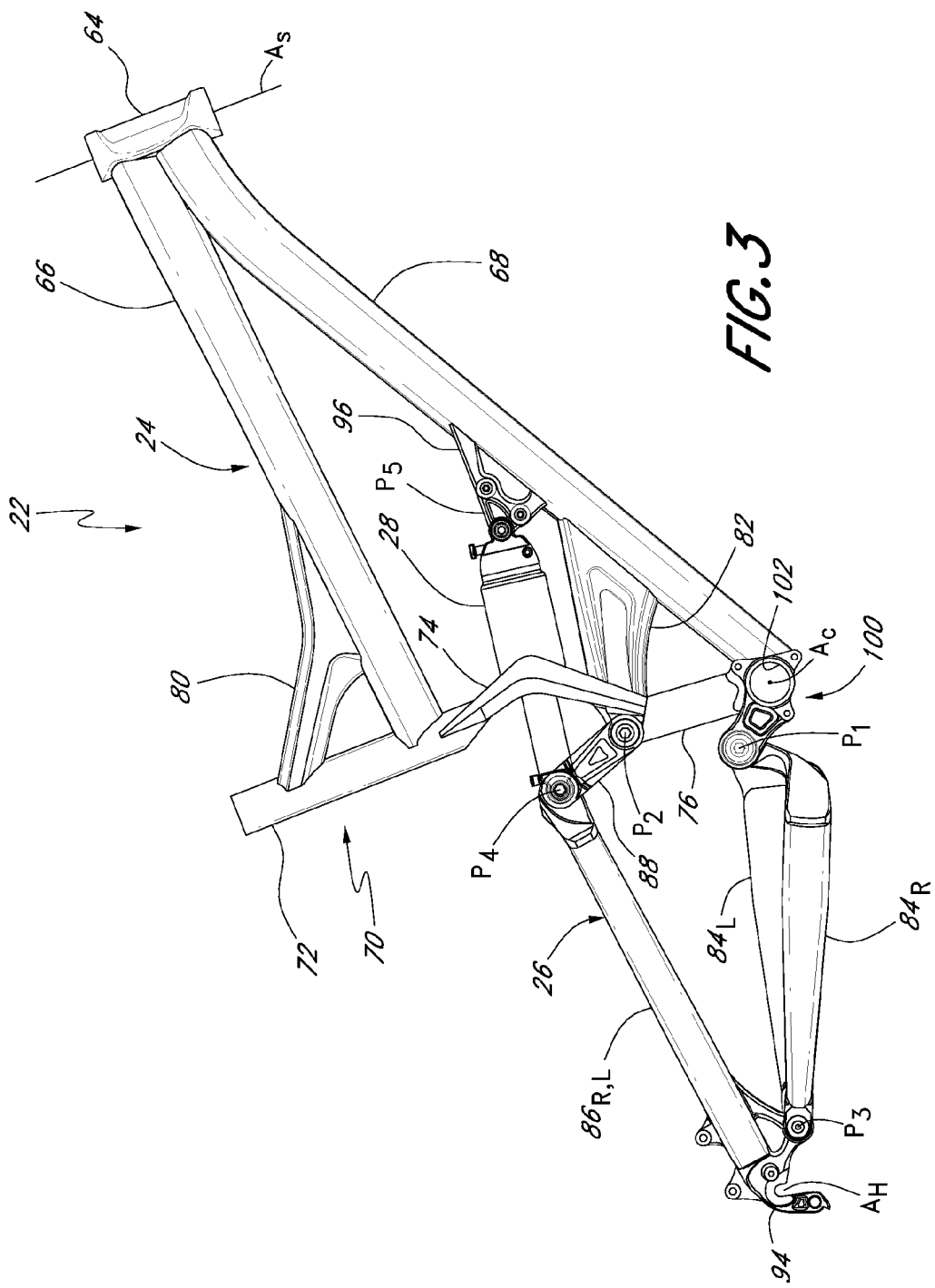
FIG. 3 is a side view of the bicycle frame assembly of FIG. 2.
Figure 4:
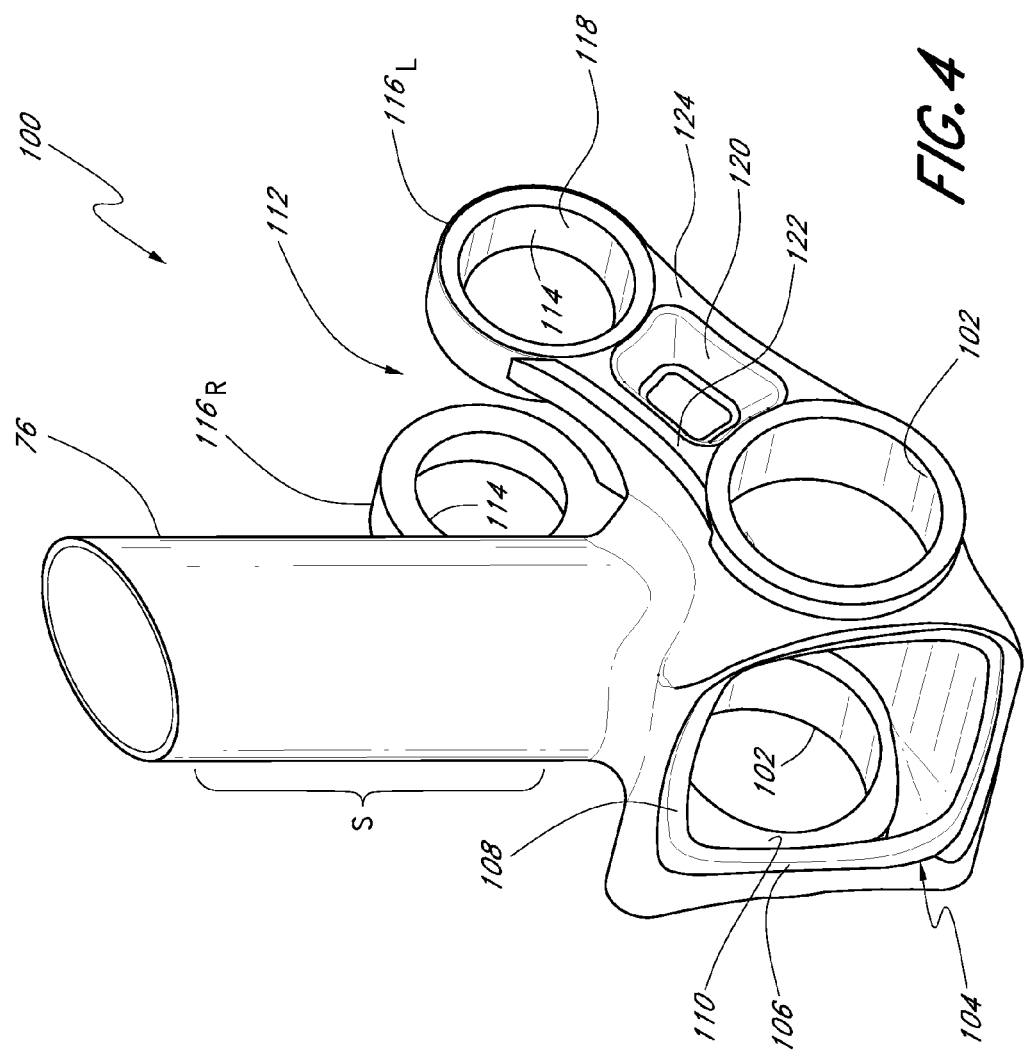
FIG. 4 is a perspective view of the front, top left side of a down tube support of the bicycle frame assembly of FIG. 2.
Figure 5:
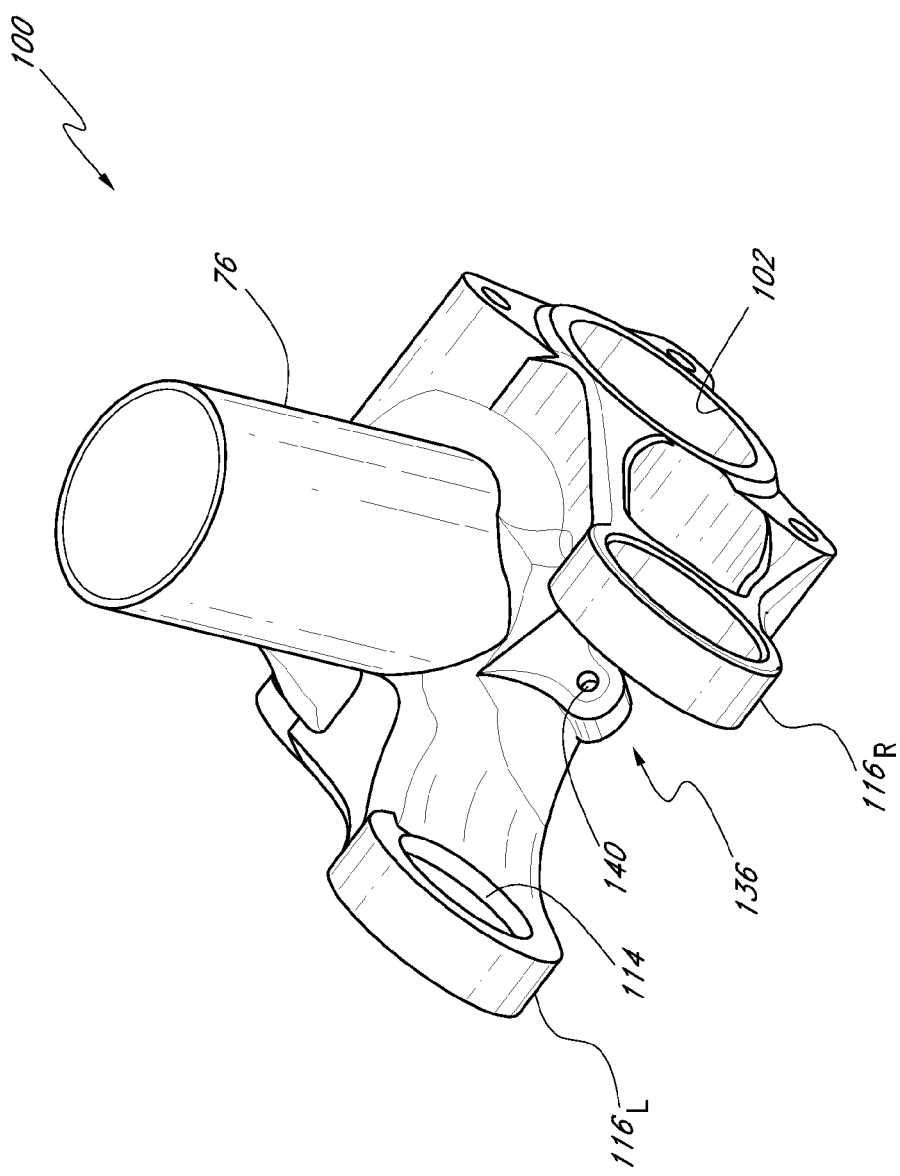
FIG. 5 is a perspective view of the rear, top right side of the down tube support of FIG. 4.

With reference to FIGS. 2 and 3, the bicycle frame assembly 22 is shown with the components of the bicycle 20, with the exception of the rear shock absorber 28, removed for clarity. As described above, the frame assembly 22 includes the main frame 24 and the sub-frame 26. The shock absorber 28 extends between and is rotatably coupled to the main frame 24 and the sub-frame 26. In the illustrated arrangement, the main frame 24 defines the crank axis $A_C$ of the bicycle frame assembly 22.

In the illustrated arrangement, the main frame 24 is generally triangular in shape and is constructed from a plurality of components that have been assembled together, preferably by a material deposition welding process. That is, preferably an arc welding process is used, such as a gas metal arc welding (GMAW or MIG) or gas tungsten arc welding (GTAW or TIG) welding process, which involves a temperature sufficiently high to melt the base materials of the frame components such that the filler material mixes with the base materials. The melting of the base material distinguishes a welding process from a brazing process, as a brazing process does not melt the base material. The advantages of welding include the following: cost-effective assembly, superior strength and relative ease of manufacture. Further, in one embodiment, the type of welding is TIG welding. The advantages of this type of welding included the following: high strength, heat treatable along with the joined materials, cost-effective, attractive, relative ease of manufacture.

Although welding is a preferred method to join the components making up the main frame and the components making up the sub-frame, other suitable joining methods may also be used, including brazing, bonding and mechanical fastening, for example, but without limitation. Desirably, the components of the main frame 24 are constructed from a metal material and, preferably, aluminum. However, other suitable materials may also be used. Furthermore, the main frame 24 may employ more than one material.

Preferably, the main frame 24 includes a head tube 64 that is configured to rotatably support the front suspension fork 30 and defines the steering axis $A_S$. A top tube 66 extends in a rearward direction from the head tube 64 and, in the illustrated embodiment, also slopes downwardly. A down tube 68 extends in a rearward direction from the head tube 64 and is situated below the top tube 66. Preferably, the head tube 64 is produced by a manufacturing process including a forging step. Such a process permits the head tube 64 to be shaped in an economical manner to provide desirable variations in material thickness to correspond with the variations in load forces experienced by the head tube 64.

In the illustrated arrangement, the top tube 66 and down tube 68 contact one another for a significant distance extending in a rearward direction from the head tube 64. Desirably, the top tube 66 and down tube 68 contact one another for at least about 2 inches rearward of the head tube 64. Preferably, the top tube 66 and down tube 68 contact one another for at least about 3 inches rearward of the head tube 64 and, more preferably, for about 4 inches rearward of the head tube 64. Such an arrangement creates a strong joint between the head tube 64, top tube 66 and down tube 68 and permits the top tube 66 and down tube 68 to reinforce one another. In addition, the intersection between the top tube 66 and down tube 68 provides an advantageously large distance over which the tubes 66 and 68 may be welded together.

In addition, preferably the top tube 66 and down tube 68 have non-circular cross sectional shapes. In one preferred arrangement, the top tube 66 and down tube 68 are generally trapezoidal in cross-sectional shape with the smaller sides of the trapezoidal shapes facing one another. That is, preferably, the lower surface of the top tube 66 has a smaller lateral width than the upper surface of the top tube 66. Conversely, the upper surface of the down tube 68 has a smaller lateral width than the lower surface of the down tube 68.

In the illustrated arrangement, the down tube 68 is also curved as it extends away from the head tube 64. Accordingly, near the head tube 64, the upper surface of the down tube 68 is generally aligned with and, preferably, contacts the lower surface of the top tube 66. Advantageously, such a construction also results in desirable "butting" of the down tube 68. That is, the wall thickness of the upper wall of the down tube 68 is reduced in the curved section while the wall thickness of the lower wall is increased in the curved section. Increased material in the lower wall of the down tube 68 is desirable to resist the high loads applied to the lower end of the head tube 64 due to the leverage provided by the front suspension fork 30. A detailed description of a preferred head tube 64, top tube 66 and down tube 68 connection is provided in U.S. patent application Ser. No. 10/459,398, filed Jun. 11, 2003, entitled "Head Tube for Bicycle Frame," the entirety of which is incorporated by reference herein and made a part of this specification.

From the head tube 64, the top tube 66 and the down tube 68 extend in a rearward direction toward a seat tube 70. In the illustrated arrangement, the seat tube 70 is an interrupted-type seat tube 70. That is, the seat tube 70 is not a continuous tubular component, but is constructed of multiple components, including an upper portion 72, an intermediate portion (generally 74) and a lower portion 76. With reference to FIG. 2, the intermediate portion 74 of the seat tube 70 includes a right side stay 74R and a left side stay 74L. The right and left stays 74R, 74L extend between and are connected to the upper portion 72 and the lower portion 76 of the seat tube 70. Furthermore, a central section of the stays 74R, 74L bow outwardly in a lateral direction to create a space configured to permit the shock absorber 28 to pass therethrough. That is, preferably, a central axis of the shock absorber 28 generally lies in a central, vertical plane that bisects the bicycle frame assembly 22. Preferably, the main frame 22 is configured such that both the head tube 64 (and steering axis $A_S$) and the seat tube 70 are canted rearwardly from a vertical axis when the bicycle 20 is resting on a generally horizontal surface S (see FIG. 1 and, more preferably, lie in the same vertical plane as the axis of the shock absorber.

Preferably, in addition to the head tube 64, top tube 66, down tube 68 and seat tube 70, the main frame 24 includes additional reinforcement members to provide advantageous strength and rigidity properties to the main frame 24. For example, in the illustrated embodiment, a gusset 80 extends from a forward side of the upper portion 72 of the seat tube to a top surface of the top tube 66. The gusset 80 stabilizes an upper end of the upper portion 72 of the seat tube 70 against fore and aft loading that is applied when a rider of the bicycle 20 applies fore and aft forces to the seat assembly 36. These forces are magnified at the seat tube 70 due to the long moment arm provided by the seat post 38. The provision of the gusset 80 also permits a rearward end of the top tube 66 to be positioned relatively low on the seat tube 70. Such an arrangement advantageously lowers the center of gravity of the bicycle frame 22.

A second gusset 82 extends from an upper end of the lower portion 76 of the seat tube 70 in a forward direction to an upper surface of the down tube 68. In the illustrated arrangement, the gusset 82 is generally horizontal. Advantageously, the gusset 82 reinforces the main frame reinforces the main frame 24 against loading applied to the seat tube 70 by the sub-frame 26, such as when the rear wheel 42 encounters a bump while the bicycle 20 is being ridden.

As described above, the sub-frame 26 is moveable relative to the main frame 24 and supports the rear wheel 42 of the bicycle 20. In the illustrated arrangement, the sub-frame 26 includes a pair of lower arms, or chain stays 84R, 84L, and a pair of upper arms, or seat stays 86R, 86L. Preferably, the chain stays 84 and seat stays 86 straddle the rear wheel 42 with the right stays 84R, 86R extending along a right side of the rear wheel 42 and the left stays 84L, 86L extending along a left side of the rear wheel 42. In addition, preferably, the right chain stay 84R is positioned lower than the left chain stay 84L. Such an arrangement advantageously positions the right chain stay 84R to avoid contact with the drive chain 48, front derailleur 54 and other components of the chain drive transmission 46.

The sub-frame assembly 26 also includes a link 88. Desirably, the link 88 includes a right arm portion 90R and a left arm portion 90L. The right arm portion 90R and the left arm portion 90L are interconnected by a central bridge 92. In the illustrated embodiment, the link 88 is a monolithic structure and may be fabricated from any suitable material, such as a metal (e.g, aluminum) or a composite (e.g., carbon fiber), for example.

Forward ends of the chain stays 84R, 84L are supported for rotation relative to the main frame 24 about a pivot axis $P_1$. Preferably, the forward ends of the chain stays 84R, 84L are also interconnected. Preferably, the pivot axis $P_1$ is located proximate the crank axis $A_C$. More preferably, the pivot axis $P_1$ is located slightly rearward and higher than the crank axis $A_C$.

A forward end of the link 88 is supported for rotation relative to the main frame 24 about a second pivot axis $P_2$. Preferably, the pivot axis $P_2$ is located substantially at a junction between the upper end of the lower portion 76 of the seat tub 70 and the rearward end of the gusset 82. However, the pivot axis $P_2$ may be positioned at other suitable locations on the main frame 24 as well.

Lower, rearward ends of the seat stays 86R, 86L are pivotally coupled to rearward ends of the respective chain stays 84R, 84L at a third pivot axis $P_3$. Forward, upper-ends of the seat stays 86R, 86L are pivotally coupled to a rearward end of the link 88 for rotation about a fourth pivot axis $P_4$. Preferably, the upper-ends of the seat stays 86R, 86L are also interconnected. Each of the pivot axes $P_1$-$P_4$ preferably are defined by suitable pivot connections, which may include a pivot shaft and bearing assembly or bushing, as is known in the art.

Preferably, the seat stays 86R, 86L each include a dropout 94, which cooperate to support the rear wheel 42 for rotation about a hub axis $A_H$. Such an arrangement allows the bicycle frame 22 to be designed to achieve a desirable, non-arcuate suspension travel path of the hub axis $A_H$ to inhibit chain forces and braking forces from interfering with the suspension movement of the sub-frame 26. Alternatively, however, the hub axis $A_H$ may be defined by dropouts associated with the chain stays 84R, 84L. In addition, the sub-frame 26 may be modified to include additional linkage members or to omit linkage members to achieve desired suspension characteristics. Further, the relative lengths, angles and location of the pivot axes $P_1$ through $P_4$ may be altered to achieve a desired path of the hub axis $A_H$ throughout the range of motion of the sub-frame 26 relative to the main frame 24.

As described above, the shock absorber 28 is connected between the main frame 24 and the sub-frame 26 of the bicycle frame 22. In the illustrated arrangement, a rearward end of the shock absorber 28 is coupled to the sub-frame 26 at the pivot axis $P_4$. However, in other arrangements the rearward end of the shock absorber 28 may be coupled to other components of the sub-frame assembly 26. For example, the rearward end of the shock absorber 28 may be rotatably coupled to the link 88 at a location spaced from the pivot axis $P_4$. Alternatively, the rearward end of the shock absorber 28 may be coupled to one or both of the seat stays 86R, 86L, one or both of the chain stays 84R, 84L or another linkage member of the sub frame 26.

A forward-end of the shock absorber is rotatably coupled to the main frame 24 at a pivot axis $P_5$. In the illustrated arrangement, the forward-end of the shock absorber 28 is supported by a shock mount bracket (generally 96) connected to an intermediate portion of the down tube 68. Preferably, the shock mount bracket 96 includes a right-side portion 96R and a left-side portion 96L, which receive a forward end of the shock absorber 28 therebetween. However, other suitable mounting brackets or mounting arrangements may also be used.

Preferably, the bicycle frame assembly 22 includes a monolithic down tube support 100, which is configured to receive and support a lower end of the down tube 68 and couple the down tube 68 to other components of the frame assembly 22. In the illustrated arrangement, the down tube support 100 is a monolithic structure including an opening 102 that extends in a lateral direction relative to a central plane extending lengthwise along the bicycle frame 22. The opening 102 defines the crank axis $A_C$. Preferably, the down tube support 100 also defines the pivot axis $P_1$ and is configured to support the forward ends of the chain stays 84R, 84L. Furthermore, preferably the lower portion 76 of the seat tube 70 is a part of the monolithic down tube support 100. In other arrangements, however, the down tube support 100 is configured only to receive the down tube 68 and permit connection to other components of the main frame 24 and does not include any pivot mounts, portions of the seat tube 70 or include the pedal crank opening 102.

FIGS. 4 through 10 illustrate a preferred down tube support 100, or lug, as an individual component, separate from the remaining components of the frame assembly 22. As described above, the illustrated embodiment of the down tube support 100 is a monolithic structure and, preferably, is manufactured by a process including a forging step. As a result, the down tube support 100 may be formed into a relatively complex shape for an acceptable cost. Further, the down tube support 100 also benefits from the increased strength properties inherent in a forging process as opposed to other manufacturing processes, such as casting or removing material from a solid block or billet of a material, for example.

The down tube support 100 preferably includes a surface defining a recess or pocket 104, which is configured to receive a lower end of the down tube 68. The recess 104 includes a side surface 106 that is configured to contact an outward facing side surface of the down tube 68. Preferably, the side surface 106 of the recess 104 defines a shape that is substantially similar to a cross-sectional shape of the down tube 68. Accordingly, the recess 104 is configured to receive and locate the down tube 68 relative to the tube support 100 without the need for precision fixturing or tack welding. This configuration provides a number of advantages, including: ease of manufacture as the tube 68 interlocks with the side surface 106 of the pocket 104 during welding, improved strength from increased welding contact area (as described in greater detail below with reference to FIGS. 12D and 12E), and improved weld quality from the overlapping between the tube 68 and the tube support 100.

Preferably, the recess 104 also includes shoulder defining an end surface 108 that extends inwardly from the side surface 106 to abut an end surface of the down tube 68. Thus, the end surface 108 of the recess 104 limits the depth that the down tube 68 may be inserted into the recess 104. Desirably, the end surface 108 is substantially planar so that it will substantially fully contact a planar-cut end of the down tube 68. This feature permits the precise and expensive mitering of the down tube 68 to be replaced with an easier-to-produce straight cut, which reduces manufacturing time and costs. However, in other arrangements, the end surface 108 may be non-planar and the end of the down tube 68 may be shaped accordingly, although in some arrangements the end of the down tube 68 will not necessarily conform to the surface shape of the end surface 108.

Desirably, the end surface 108 defines an opening 110, which extends at least partially through the down tube support 100 and intersects the opening 102. Preferably, a width of the end surface 108 generally corresponds to a wall thickness of the down tube 68 to support the down tube 68 without including unnecessary material, which adds weight to the down tube support 100 and, therefore, to the frame assembly 22.

In the illustrated arrangement, the side surface 106 of the pocket 104 entirely surrounds an end portion of the side surface of the down tube 68. However, in other arrangements, the side surface 106 of the pocket 104 may contact only a portion of the side surface of the down tube 68. Preferably, the side surface 106 is a locator surface that contacts a sufficient portion of the side surface of the down tube 68 to assist in locating the down tube 68 relative to the down tube support 100 prior to the tube 68 and support 100 being joined together. In one alternative arrangement, the recess or pocket 104 may be defined by one or more projecting surface features of the down tube support 100, rather than by an indentation feature in a surface of the down tube support 100. In addition, the side surface 106 may contact an inner surface of the down tube 68, rather than an outward-facing side surface.

As described above, desirably the down tube support 100 includes an opening 102 that extends laterally through the support 100. The opening 102 is configured to receive and support the pedal crank assembly 44. This configuration provides a number of advantages, including ease of manufacture. In other arrangements, however, the opening 102 may be defined by a separate member that is connected to the down tube support 100. For example, in an alternative arrangement the opening 102 may be defined by a tube that is subsequently coupled to the down tube support 100, by welding, for example. In such an arrangement, the down tube support 100 may include a surface sized and shaped to receive and/or locate the tube.

In the illustrated embodiment, the down tube support 100 forms the lower portion 76 of the seat tube 70. Preferably, the lower portion 76 of the seat tube 70 is in the shape of a cylindrical, tubular member that extends in a radial direction from the crank axis $A_C$. Desirably, the lower portion 76 of the seat tube 70 is oriented relative to the recess 104 such that the lower portion 76 of the seat tube 70 is canted in a rearward direction from a vertical axis when the down tube support 100 is included within an assembled bicycle frame 22. Preferably, the lower portion 76 of the seat tube 70 defines a derailleur mount surface S, configured to support the front derailleur 54 at a location spaced from the crank axis $A_C$ a suitable distance to permit the front derailleur 54 to be operable with a conventional pedal crank assembly 44 associated with the bicycle frame assembly 22. Desirably, the derailleur mount surface S permits the derailleur to be mounted a distance from the crank axis $A_C$ as specified by the derailleur manufacturer. Preferably, for a commonly available front derailleur 54 (such as models produced by Shimano, for example) the derailleur mount surface S permits the derailleur 54 to be mounted between approximately 2 and 4 inches from the crank axis $A_C$ and, more preferably, about 3 inches from the crank axis $A_C$. Typically, a front derailleur 54 is configured to clamp about the outer surface of the lower portion 76 of the seat tube 70, which preferably is generally cylindrical in shape. However, the lower portion 76 of the seat tube 70 may also be provided with a mounting tab to accommodate a so-called "braze-on" type derailleur 54.

Preferably, the down tube support 100 also defines a pivot mount portion 112. The pivot mount portion 112 desirably includes a laterally extending opening 114 that defines the pivot axis $P_1$. The illustrated pivot mount portion 112 includes a right arm 116R and a left arm 116L. The right and left arms 116R, 116L extend generally rearwardly from the opening 102 and, preferably, straddle the lower portion 76 of the seat tube 70. The right arm 116R and the left arm 116L define a space therebetween sized and shaped to receive the forward ends of the chain stays 84R, 84L.

The opening 114 is configured to receive a pivot bolt or pivot shaft (not shown) which interconnects the chain stays 84R, 84L with the down tube support 100. Each of the arms 116R, 116L include a counter-bore, or recess 118, extending inward from an outer surface of the respective arm 116R, 116L. The counter-bore 118 is centered about the opening 114 and has a diameter greater than the diameter of the opening 114. The recess 118 is configured to receive and support a bearing or bushing, which rotatably supports the pivot bolt or pivot shaft (not shown). Although such a pivot mount 112 is preferred, other suitable pivot mounts may be provided instead. For example, in one alternative arrangement, only one arm 116 may be provided and forward ends of the chain stays 84 may be positioned on opposing sides of the single arm 116.

Preferably, each of the arms 116R, 116L include a recess 120 extending inwardly from an outer surface of the arms 116R, 116L between the bottom bracket opening 102 and the pivot mount opening 114. An upper rib 122 and a lower rib 124 extend above and below, respectively, the recess 120 between the opening 102 to the opening 114. The provision of the recess 120 removes unnecessary material to lower the weight of the down tube support 100 and, as a result, reducing the overall weight of the bicycle frame 22.

Desirably, the down tube support 100 is configured to protect the internal space of the down tube 68 from the outside elements, such as dirt and water. Preferably, when part of a complete bicycle 20, the down tube support 100 substantially closes off the bottom end of the down tube 68.

That is, preferably, the down tube 68 closes off the pocket 104, the pedal crank assembly 44 closes off the opening 102 and the gusset 82 closes off the top of the tube 76 such that foreign material is substantially inhibited from reaching the internal space of the down tube 68. However, small vent holes may be provided to permit moisture to exit the internal space defined by the down tube 68 and other components of the frame 22.

Such an arrangement is in contrast to a bottom bracket member disclosed in U.S. patent application Ser. No. 10/656,922, filed Sep. 4, 2003, entitled "Bicycle Rear Suspension," which is incorporated by reference in its entirety and made a part of this specification. The bottom bracket member disclosed in the '922 application provides a surface to which the end surface of the down tube may be abutted against and welded. However, the bottom bracket member of the '922 application does not include a pocket for receiving the end of the down tube and does not close the open lower end of the down tube. Thus, the interior of the down tube is not protected from outside elements or foreign matter.

Figure 6:
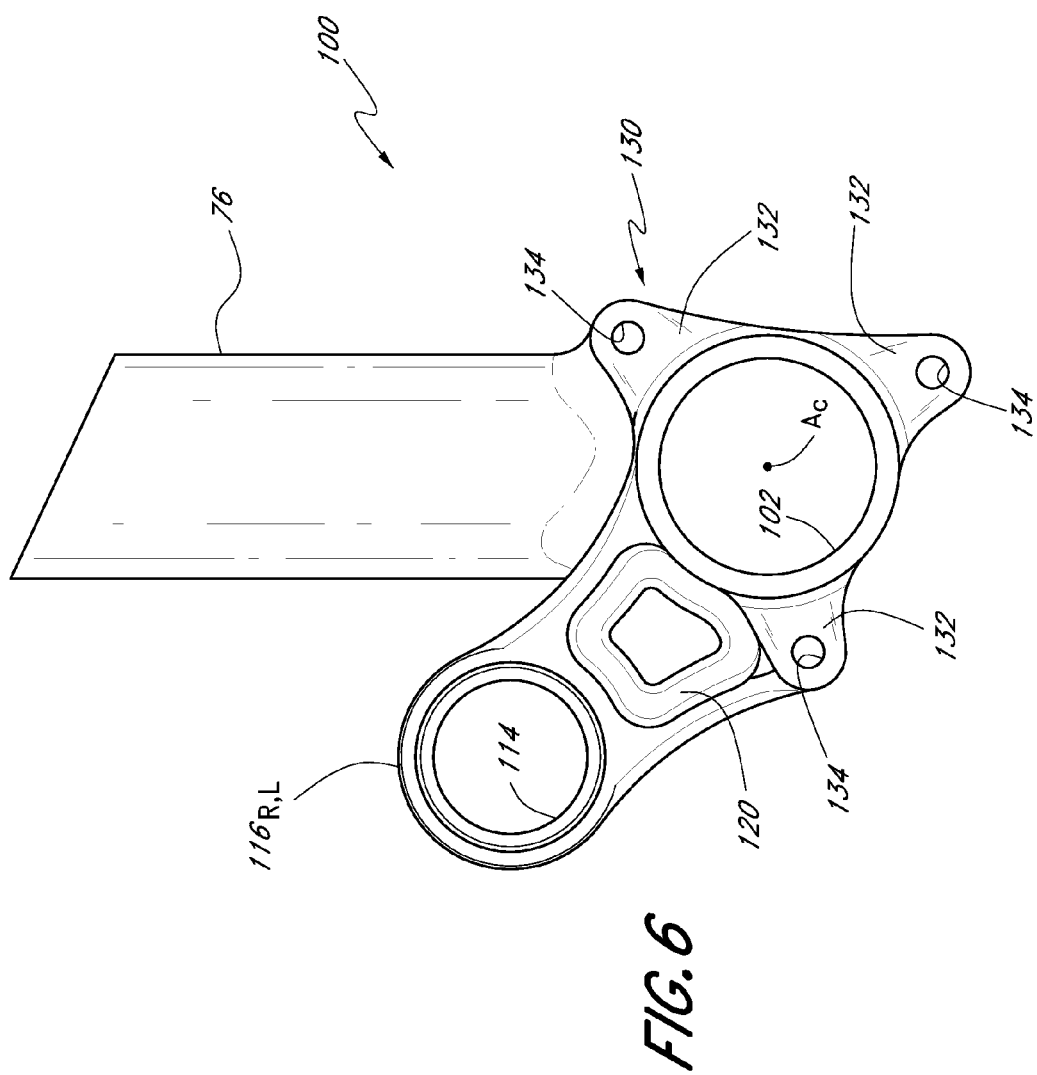
FIG. 6 is a right side view of the down tube support of FIG. 4.
Figure 7:
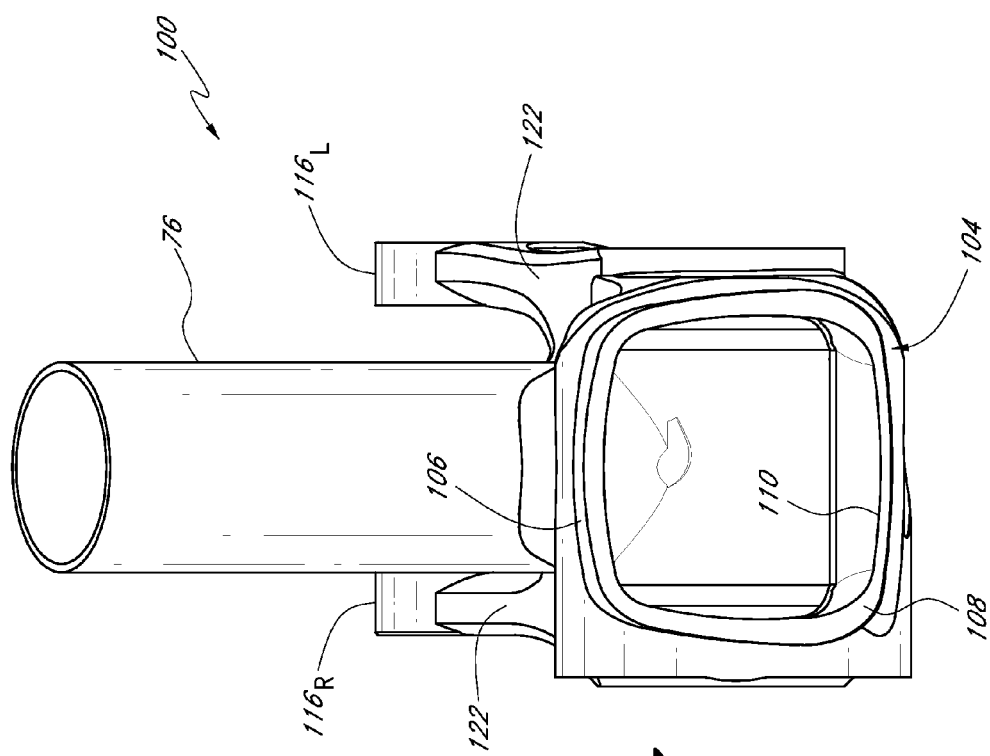
FIG. 7 is a front view of the down tube support of FIG. 4.
Figure 8:
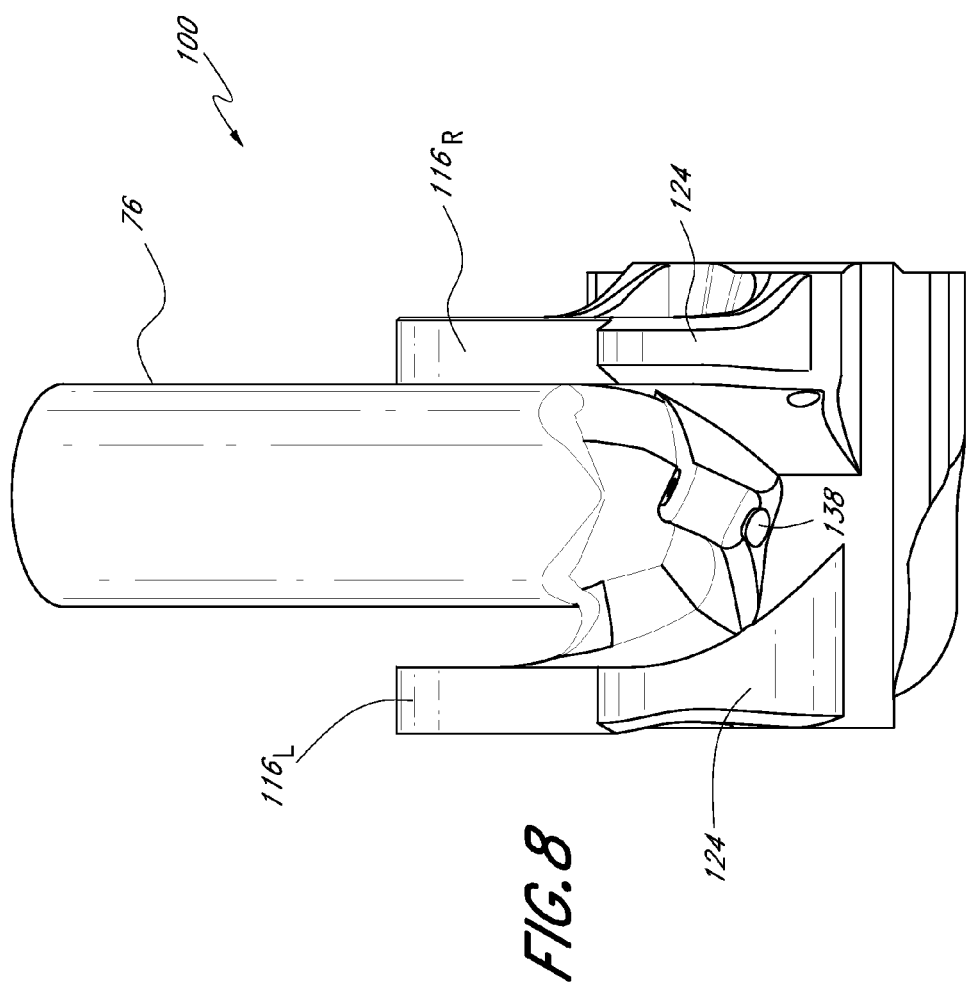
FIG. 8 is a rear view of the down tube support of FIG. 4.
Figure 9:
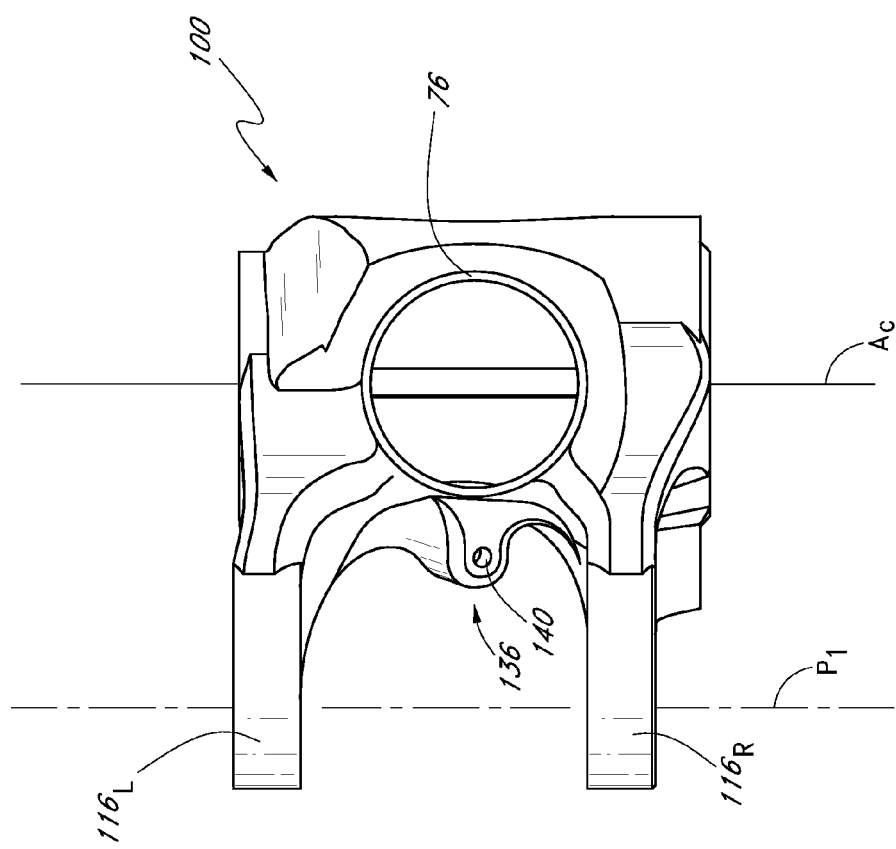
FIG. 9 is a top view of the down tube support of FIG. 4.

With reference to FIG. 6, preferably the down tube support 100 includes a chain guide mount 130 on the right side of the opening 102. In the illustrated arrangement, the chain guide mount 130 includes three mounting bosses 132 equally spaced around the crank axis $A_C$. Each of the mounting bosses 132 includes a threaded mounting hole 134 configured to receive a threaded fastener to permit a conventional chain guide to be mounted to the down tube support 100.

With reference to FIGS. 5 and 8-10, preferably the down tube support 100 also includes a cable stop 136. The cable stop 136 is configured to cooperate with a control cable extending from the rider control 62 to the front derailleur 54 (FIG. 1). The cable stop 136 includes a large diameter passage 138 extending from a lower surface of the body of the cable stop 136. The large diameter passage 138 is aligned with a small diameter passage 140 extending from an upper surface of the body of the cable stop 136 to meet the large diameter passage 138 within the body of the cable stop 136. The large diameter passage 138 is configured to receive a cable housing portion of a control cable and the small diameter passage 140 is configured to permit a wire portion of the control cable to pass therethrough. The cable wire is connected to the front derailleur 54 to move the front derailleur 54 throughout its available range of movement.

Figure 11A:
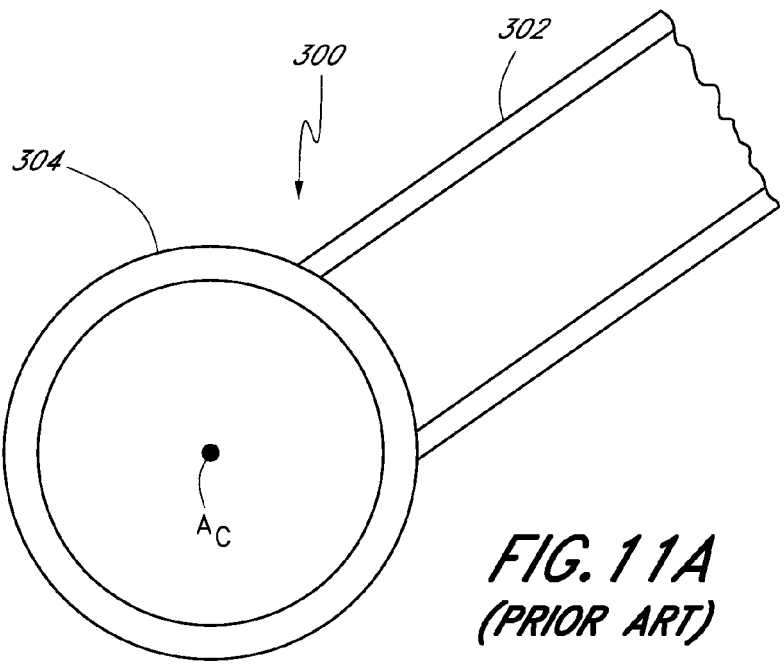
FIGS. 11A through 11C illustrate an intersection between a down tube and a bottom bracket shell of a common prior art bicycle frame.
Figure 11B:
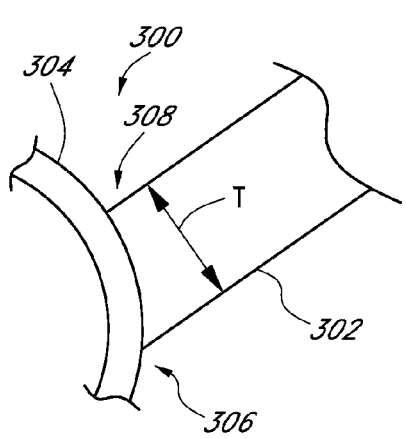
Figure 11C:
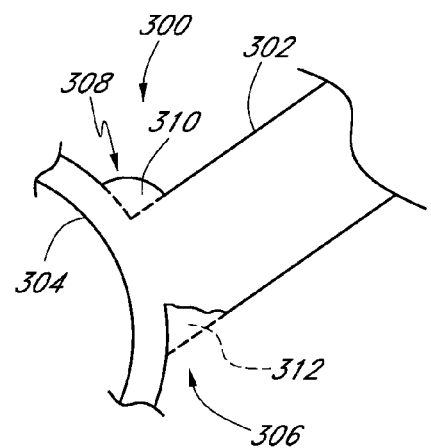

FIGS. 11A through 11C illustrate a prior art connection 300 between a down tube 302 and a bottom bracket shell 304. Each of the down tube 302 and bottom bracket shell 304 are hollow, tubular members having a relatively small wall thickness, as is common in conventional bicycle frame constructions. The end of the down tube 302 is shaped, or mitered, to match the cylindrical outer shape of the bottom bracket shell 304. The down tube 302 is butted against the bottom bracket shell 304 in the form of a simple butted joint, held in place by a fixture, and welded to joint the tube 302 and the shell 304.

With reference to FIG. 11B, the wall of the down tube 302 has a thickness T and contacts the outer surface of the bottom bracket shell 304 along a distance substantially equal to the thickness T of the down tube 302. Because the down tube 302 is hollow, an air space 306 within the down tube 302 is separated from a weld zone 308 by only the thickness T of the down tube 302. Further, the contact surface between the bottom bracket shell 304 and the end surface of the down tube 302 extends directly between the weld zone 308 and the air space 306 along a generally linear path. Such an arrangement permits heat generated from the welding process to travel easily through the wall of the down tube 302 toward the air space 306 and melt the material of the down tube 302 and bottom bracket shell 304 adjacent the air space 306.

With reference to FIG. 11C, the juncture 300 between the down tube 302 and the bottom bracket shell 304 is shown after welding. As is apparent, a weld bead 310 comprising a filler material is deposited in the weld zone 308 and joined with the base material of the down tube 302 to the bottom bracket shell 304. However, on the backside of the down tube wall within the down tube 302 a crater 312 is formed due to the heat from the weld passing through the intersection between the down tube 302 and the bottom bracket shell 304 and drawing the molten base material toward the weld zone 308. The crater 312 results because the combination of down tube 302 material and bottom bracket shell 304 material is not capable of adequately dissipating the heat produced by the welding process. As a result, the strength of the simple butted joint between the down tube 302 and the bottom bracket shell 304 is less than desirable.

With reference to FIGS. 12A through 12C, a juncture 150 between a preferred embodiment of the down tube 68 and a preferred embodiment of the down tube support 100 is illustrated before and after welding for the sake of comparison to the above-described prior art connection 300. As described above, the down tube 68 is received in a pocket 104 such that a side surface 106 of the pocket 104 contacts a side surface 152 of an end portion of the down tube 68. In addition to providing the advantage of locating the down tube 68 relative to the down tube support 100, the pocket 104 also improves the strength properties of the joint, or juncture 150, as a result of the welding process.

With reference to FIG. 12B, desirably the side surface 106 of the pocket 104 defines a depth D of the pocket 104. Thus, a weld zone 154 of the joint 150 is not located at the very end of the down tube 68 but is spaced from the end surface of the down tube 68 by a distance equal to the depth D of the pocket 104. Accordingly, an air space 156 within the down tube 68 and adjacent the intersection between the down tube 68 and tube support 100 is spaced from the weld zone 154 a distance equal to the depth D plus the thickness T when moving along the contact surface of the intersection between the down tube 68 and the pocket 104. Accordingly, such a joint is better capable of dissipating the heat produced by the welding process and limiting the molten base material to a region close to the weld zone 154.

With reference to FIG. 12C, the juncture 150 includes a weld bead 158 in the weld zone 154 that couples the down tube 68 to the down tube support 100. Advantageously, with the illustrated arrangement of the down tube 68 being received within the pocket 104, no degradation of the inner surface of the down tube 68 occurs because the heat from the welding process may be dissipated by the increased volume of material surrounding the weld zone 154 and/or increased length of contact between the down tube 68 and down tube support 100 from the weld zone 154 to the air space 156.

Figure 12E:
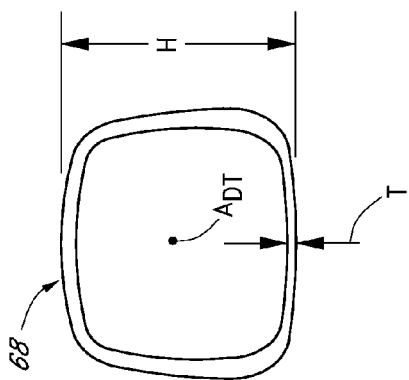
Figure 12D:
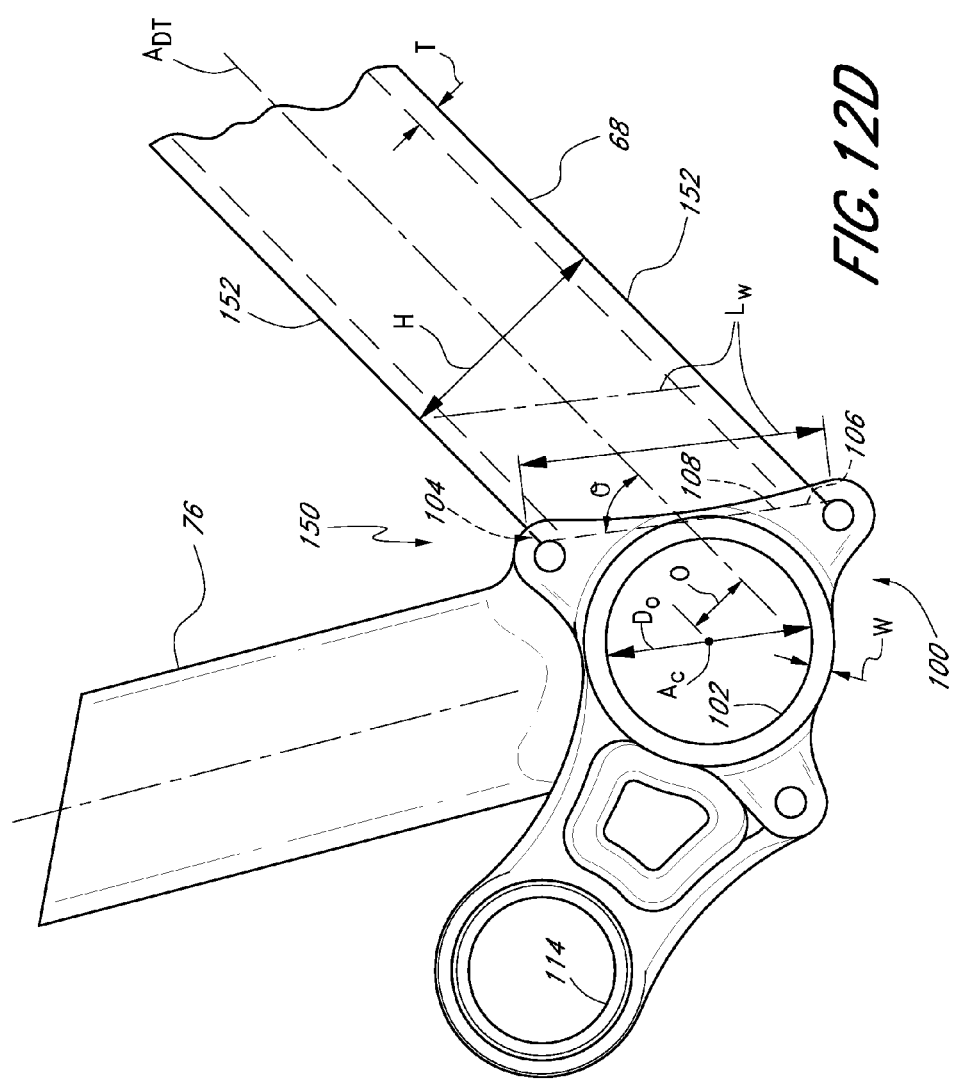

With reference to FIG. 12D, a preferred connection 150 between a preferred embodiment of the tube support 100 and the down tube 68 is shown. As described above, the connection 150 provides several advantages including improved strength and easier manufacture. Advantageously, the connection 150 also permits an angle of intersection θ between an axis $A_{DT}$ of the down tube 68 and the surface of the tube support 100 to which the down tube 68 is abutted and/or is welded. In the instant embodiment, the down tube 68 abuts the end surface 108 of the pocket 104 and is welded to a surface of the tube support 100 surrounding the pocket 104, which preferably is generally parallel to the end surface 108.

Adjustment of the angle of intersection θ permits the weld length $L_W$ of the lateral side walls of the down tube 68 to be adjusted. For example, a minimum weld length $L_W$ of the side walls is produced when the axis $A_{DT}$ of the down tube 68 is oriented perpendicular to the welding surface of the tube support 100. In such an arrangement, the weld length of the side walls of the down tube 68 would be generally equal to a height H of the side walls of the down tube 68 (the dimension of the side walls in a direction perpendicular to the down tube axis $A_{DT}$). In one arrangement, the side walls of the down tube 68 may have an external dimension of approximately 1.5 inches. The weld length of the side walls of the down tube 68 may be increased if the angle of intersection θ is reduced from 90 degrees, as illustrated by the broken line labeled $L_W$ in FIG. 12D. Preferably, the angle of intersection θ is between about 25 and 90 degrees and, more preferably, between about 30 and 45 degrees. The illustrated angle of intersection θ is about 70 degrees. In such an arrangement, the weld length may be increased to about 4.5 inches for the side walls of the down tube 68 and up to about 2.5 inches for the upper and lower walls of the down tube 68, assuming conventional dimensions for the pedal crank assembly 44.

It will be appreciated that the weld length of the upper and lower walls of the down tube 68 generally is limited by the width of the down tube 68, which is limited by the width of the pedal crank assembly 44 that is generally determined by the manufacturer of the pedal crank assembly 44. Although, with the present down tube support 100, the width of the down tube 68 may be somewhat wider than possible with a conventional bottom bracket shell design, the width may be limited by clearance issues with the pedal crank assembly 44. Thus, the weld length $L_W$ of the side walls of the down tube 68 is more easily altered than the weld length of the upper and lower walls.

Preferred embodiments of the down tube support 100 also permit the dimensions of the down tube 68 to be increased beyond the dimensions of the prior art bottom bracket shell (FIGS. 11A-11C). This is because the dimensions of the pocket 104 are not limited by the diameter of the pedal crank opening 102. In prior art bottom bracket shells comprising a tube, the wall thickness of the tube must be limited to a reasonable thickness or the overall weight of the frame would be undesirably increased. Thus, the overall outside diameter of the bottom bracket shell is limited by a combination of the diameter of the opening 102 (an industry standard determined by the pedal crank 44 manufacturer) and a reasonable wall thickness of the bottom bracket shell itself. The diameter of the down tube is effectively limited to a dimension no greater than the diameter of the bottom bracket shell so that the down tube may be welded to the shell or else a portion of the down tube must be welded to the seat tube. As a result, the down tube would have to be positioned such that at least some proportion of the height of the down tube is located above the bottom bracket shell. Such an arrangement severely limits space available within the bicycle frame to accommodate components, such as the rear shock absorber, for example.

As is known, the resistance to torsional flex of the down tube 68 is heavily influenced by its diameter (or height and width dimensions—for non-circular down tubes). The greater the diameter, the greater the resistance to torsional flex, which results in a bicycle frame that more efficiently transfers the riders force input to the pedal crank assembly 44 into forward motion rather than into torsional flexing of the bicycle frame. Accordingly, in the illustrated embodiment, the height H of the down tube 68 desirably is greater than the diameter of the opening $D_O$. Preferably, the height H of the down tube 68 is greater than a combination of the diameter $D_O$ of the opening 102 for the pedal crank assembly 44 and two times the wall thickness W of the "shell" portion of the down tube support 100. It is not necessary that the down tube support 100 include a "shell" portion as shown in the illustrated embodiment. In general, however, a reasonable wall thickness of the bottom bracket "shell" may be assumed to be generally equivalent to a wall thickness of an end portion of the down tube 68. Thus, preferably, a height H of the down tube 68 is greater than the diameter of the opening 102 plus two times the thickness T of the end portion of the down tube 68, at a location where the down tube 68 connects to the down tube support 100. In addition, the down tube 68 preferably is connected directly to the down tube support 100 and is not connected to a seat tube 70 of the bicycle frame 22 (or to the tube 76 portion of the down tube support 100, in the illustrated embodiment).

With reference to FIG. 12E, preferably, the down tube 68 has a non-circular cross-sectional shape. In the illustrated arrangement, the down tube 68 has a generally trapezoidal shape with the shorter side of the trapezoid being the upper wall and the longer side of the trapezoid being the lower wall, as described above. The provision of a non-circular cross-sectional shape increases the total weld length over the weld length that is possible with a circular down tube having the same maximum dimensions. In other arrangements, the down tube 68 may have other non-circular shapes, such as elliptical or square, for example. Although non-circular shapes are preferred, the down tube 68 may be circular if desired.

Another advantage of the preferred embodiments of the down tube support 100 is that the axis $A_{DT}$ of the down tube 68 may be offset from the crank axis $C_A$. In a prior art bottom bracket shell constructed from a tube, the axis of the down tube is limited to being generally aligned with the crank axis $A_C$ defined by the bottom bracket shell. However, in the illustrated embodiment, the axis $A_{DT}$ of an end portion of the down tube 68 that is connected to the down tube support 100 may be offset from the crank axis $A_C$ by a significant offset distance O (FIG. 12D). In some arrangements, the offset distance O may be between approximately 0.25 and 3 inches and, in some arrangements, even greater. Preferably, the offset distance O is approximately 2 inches. Such an arrangement allows the location of the down tube 68 to be altered to provide room for components (such as the shock absorber 28, for example) of the bicycle 20 between the down tube 68 and the top tube 66. Further, the down tube may be curved and include both a primary axis and a connection axis that preferably are offset below the crank axis $A_C$, as is described in greater detail below with reference to FIG. 15.

Figure 13:
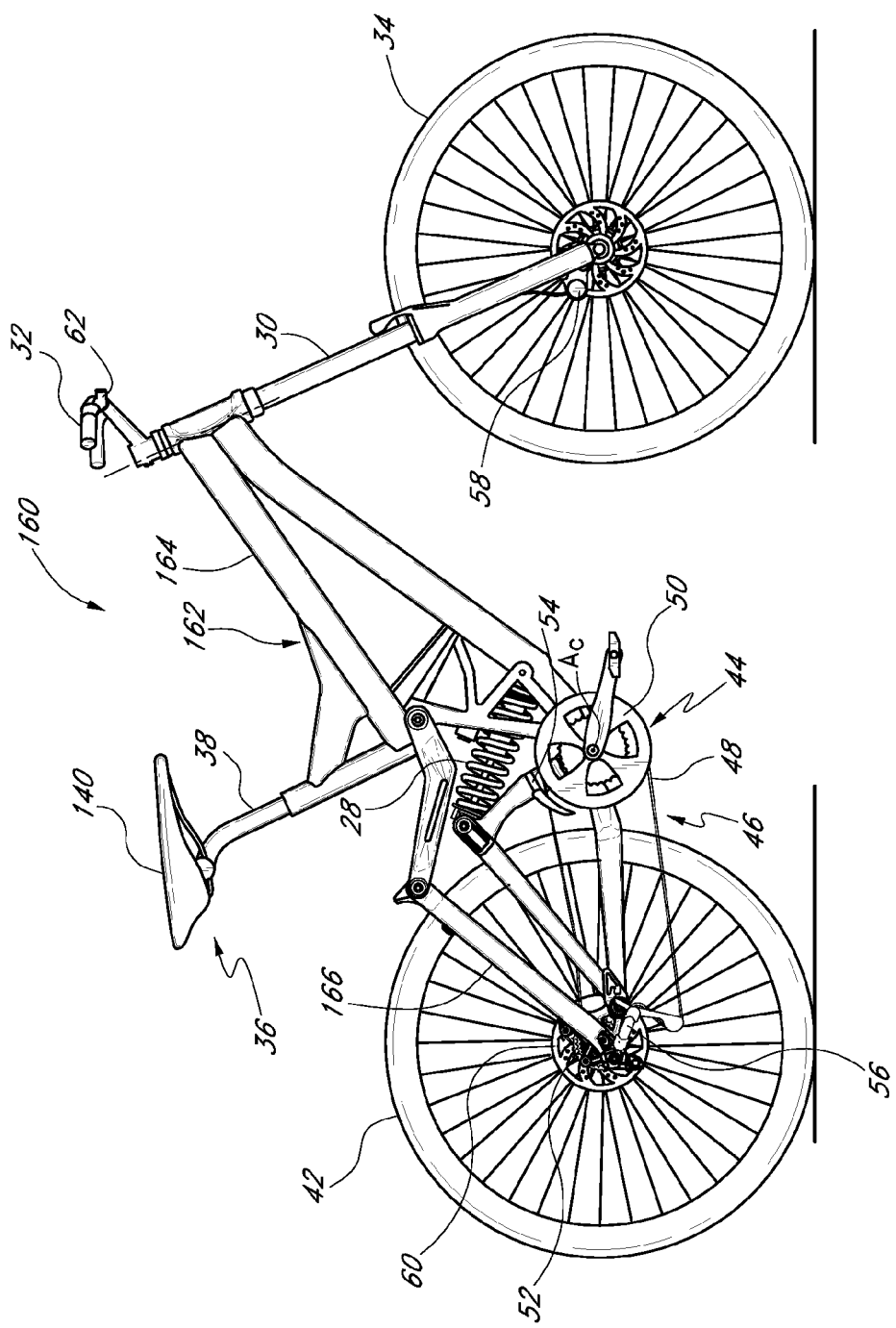
FIG. 13 is an elevational view of a bicycle including a modification of the frame assembly of FIG. 2.

With reference to FIG. 13, a bicycle 160 includes a modification of the frame assembly 22 of FIG. 2 and is generally indicated by the reference numeral 162. With the exception of the frame assembly 162, the bicycle 160 includes substantially the same components as the bicycle 20 of FIG. 1. Accordingly, similar components of the bicycle 160 are indicated by the same reference numerals as the bicycle 20 of FIG. 1. As a further description of the bicycle components is not deemed necessary to permit one of skill in the art to practice the present invention, a further description of the components is not provided except wherein such a description is relevant to the bicycle frame assembly 162.

Figure 14:
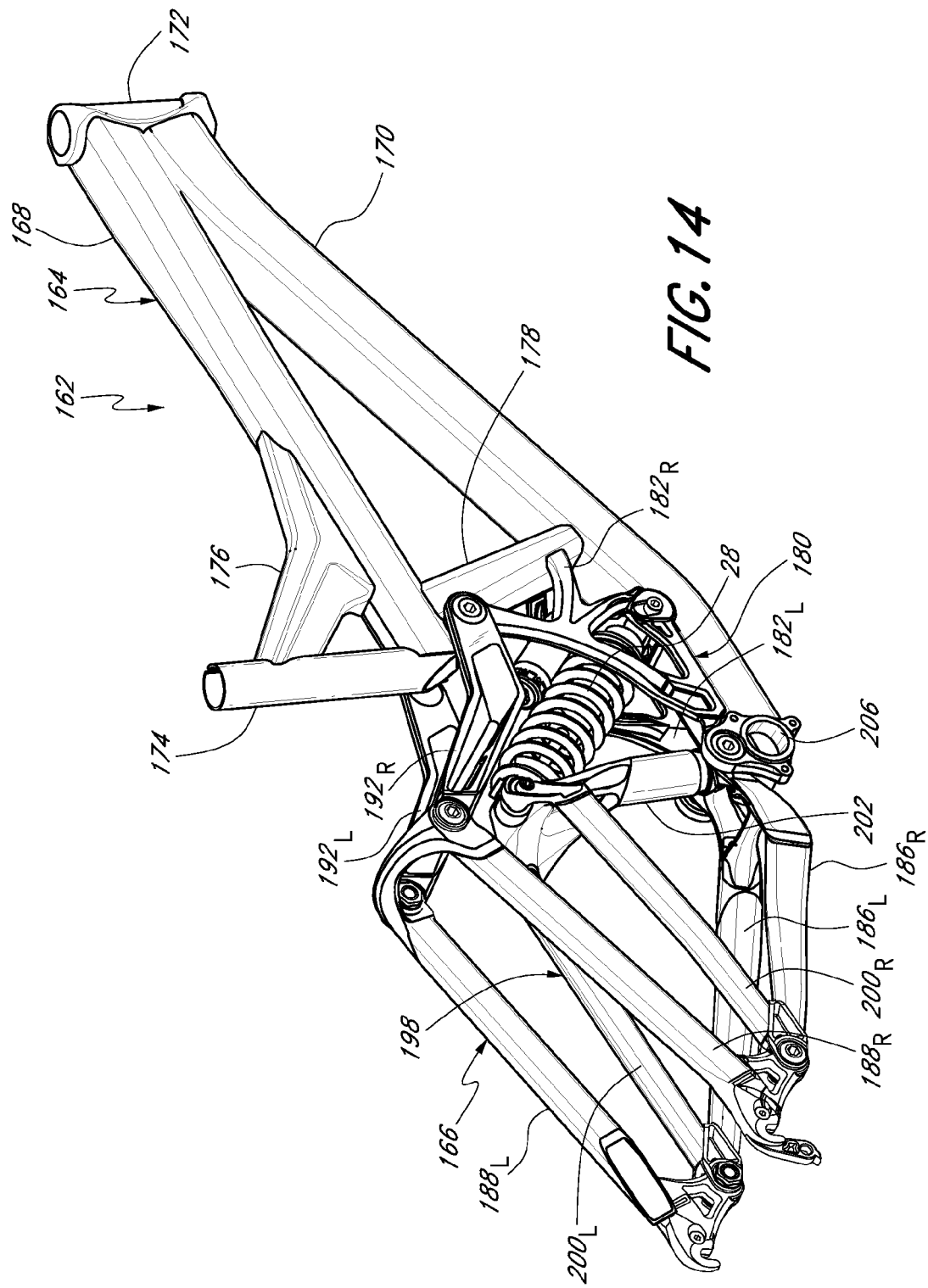
FIG. 14 is a perspective view of the frame assembly of the bicycle of FIG. 13.
Figure 15:
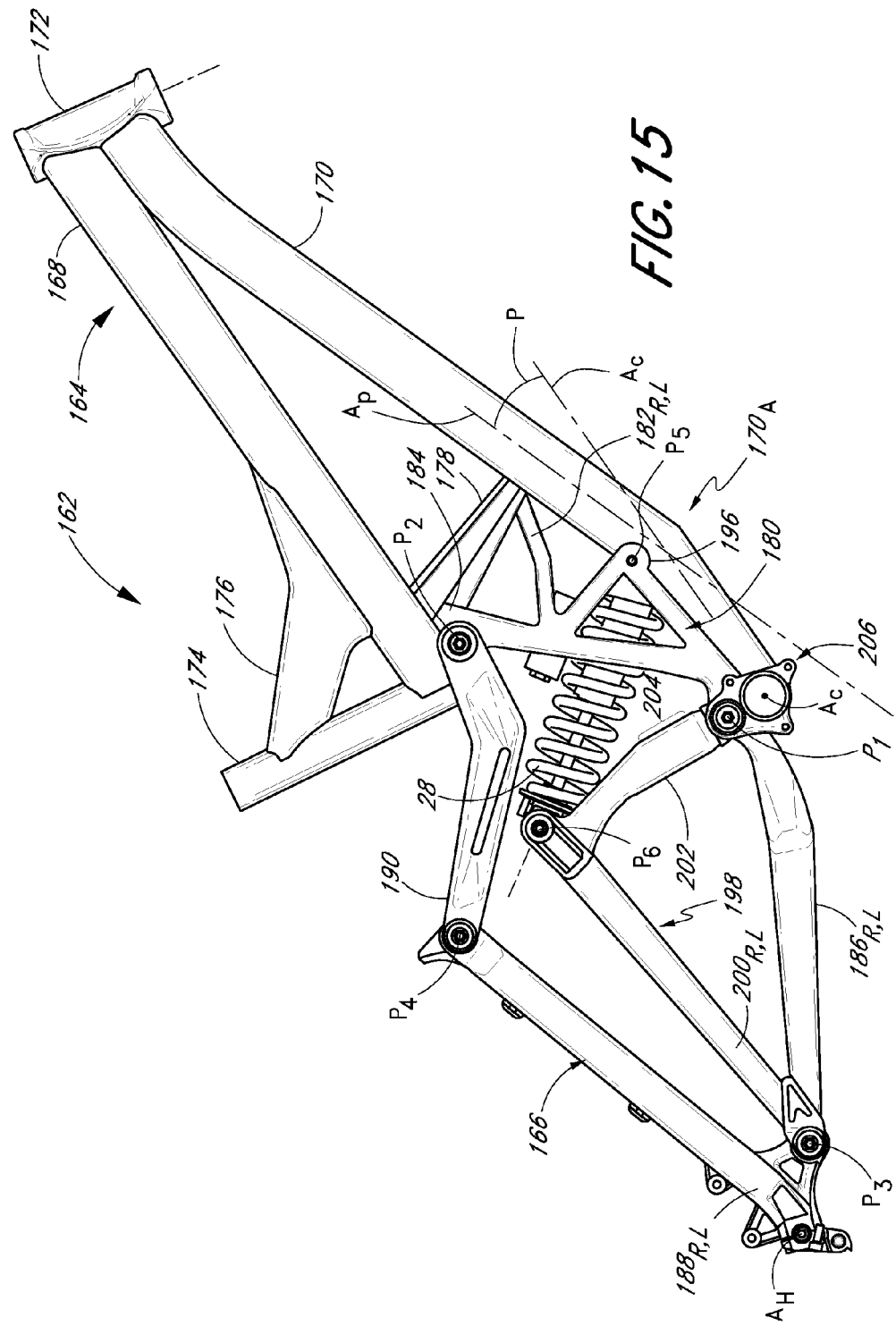
FIG. 15 is a side view of the frame assembly of FIG. 14.

FIGS. 14 and 15 show the bicycle frame assembly 164 with the components of the bicycle 160 removed for clarity.

The bicycle frame 162 includes a main frame 164 and a sub-frame 166. The sub-frame 166 is moveable relative to the main frame 164. A shock absorber 28 regulates movement between the sub-frame 166 and the main frame 164.

The main frame 164 includes a top tube 168 and a down tube 170 extending in a rearward direction from a head tube 172. Preferably, the top tube 168 and down tube 170 are non-circular in cross-sectional shape and, more preferably, are generally trapezoidal in cross-sectional shape. The connection between the head tube 172, top tube 168 and down tube 170 preferably is substantially similar to that described above with reference to the frame assembly 22 of FIG. 2.

Desirably, a rearward end of the top tube 168 is connected to a lower portion of a seat tube 174. A gusset 176 extends between a forward side of the seat tube 174 and a top side of the top tube 168 to provide strength and resist fore and aft flex of the seat tube 174. A support stay 178 extends between the lower side of a rearward end of the top tube 168 and an intermediate portion of the down tube 170 to separate the rearward ends of the top tube 168 and down tube 170 in a vertical direction.

The main frame 164 also includes a support brace 180 that extends between the support stay 178 and a rearward end of the down tube 170. In the illustrated arrangement, the support brace 180 includes a right side portion 182R and a left side portion 182L which are spaced apart in a lateral direction to permit the shock absorber 28 to pass therebetween. Thus, the brace portions 182R, 182L define a basket, or cage, to receive and protect the shock absorber 28. The brace portions 182R, 182L are joined at an upper end 184 and are connected to an upper end portion of the support brace 178. Desirably, the brace portions 182R, 182L are fabricated from a process including a forging step. Additional process steps may also be employed in the fabrication of the brace 180.

The sub-frame 166 preferably includes a pair of chain stays 186R, 186L, a pair of seat stays 188R, 188L, and a link 190. Preferably, a forward end of the chain stays 186R, 186L are joined together and rotatably mounted to the main frame 164 for rotation about a pivot axis $P_1$ located proximate the crank axis $A_C$. In the illustrated arrangement, the pivot axis $P_1$ is located slightly behind and above the crank axis $A_C$. Preferably, the link 190 includes a right arm portion 192R, a left arm portion 192L and a bridge portion 194 extending between and connecting the right arm portion 192R, a left arm portion 192L. A forward end of the link 190 is rotatably coupled to the main frame 164 for rotation about a pivot axis $P_2$ desirably located near the junction of the top tube 168 and the support stay 178.

Preferably, rearward ends of the chain stays 186R, 186L are pivotally coupled to lower, rearward ends of the seat stays 188R, 188L, respectively, for a rotation about a pivot axis $P_3$. Upper ends of the seat stays 188R, 188L preferably are joined together and supported for rotation relative to the link 190 at a pivot axis $P_4$. Although such an arrangement is preferred, the sub-frame 166 may also be of other suitable constructions, similar to those described above with reference to the frame assembly 22 of FIG. 2.

A forward end of the shock absorber 28 is rotatably coupled to the main frame 164 for a rotation about a pivot axis $P_5$. The pivot axis $P_5$ preferably is defined by a shock mount 196 that is defined by the support brace 180. A rearward end of the shock absorber 28 is rotatably coupled to the sub-frame 166 and, more specifically, to a shock mount assembly 198 for a rotation about a pivot axis $P_6$. The shock mount assembly 198 preferably includes a first arm 200 and a second arm 202 that, along with the chain stays 186R, 186L, define a triangular shape in plan view. The arm 200 preferably includes a right side arm 200R and a left side arm 200L, which straddled the rear wheel 42 of the bicycle 160. The forward, upper end of the arms 200R, 200L are joined together and also coupled to the arm 202.

The arm 202 preferably defines a derailleur mount section 204 to permit a derailleur to be mounted at a spaced location from the crank axis $A_C$ to permit the front derailleur 54 to be operable with a conventional pedal crank assembly 44. Desirably, the derailleur mount section 204 permits the derailleur to be mounted between approximately 2 and 4 inches from the crank axis $A_C$. Preferably, the derailleur mount section 204 permits the derailleur to be mounted about 3 inches from the crank axis $A_C$.

In the illustrated arrangement, the shock mount 198 positions the pivot axis $P_6$ at a height above the pivot axis $P_5$ of the front of the shock absorber 28. Accordingly, the bicycle frame assembly 162 may accommodate a shock absorber 28 having a length sufficient to provide an advantageous amount of suspension travel while also accommodating the rear wheel 42 of the bicycle 160 at a desirable distance from the crank axis $A_C$.

Desirably, the bicycle frame 162 also includes a down tube support 206 that shares features with the down tube support 100 of FIGS. 4 through 10. Thus, the down tube support 206 defines a recess or pocket (not shown) similar to the pocket 104 of the down tube support 100 to receive a rearward end of the down tube 170. Preferably, the down tube support 206 also includes a pivot mount that defines the pivot axis $P_1$ and is configured to support the forward ends of the chain stays 186R, 186L. However, in the illustrated arrangement, the down tube support 206 does not include a tube (similar to the tube 76 of the down tube support 100) to which the front derailleur 54 is mounted. Instead, as described above, the front derailleur 54 may be mounted to the support 202 of the shock mount assembly 198.

One advantage provided by the down tube support 206 is that the angle of intersection between the down tube 170 and the down tube support 206 may be adjusted as desired and is not limited by the position of the crank axis $A_C$. As a result, it becomes possible to alter the shape of the down tube 170 and the location of an axis of the down tube 170 relative to the crank axis $A_C$. For example, the down tube 170 illustrated in FIG. 15 includes a curved section 170A near its lower end. The curved section 170A corresponds with a location of the mount 196 for the shock absorber 28 and positions the pivot axis $P_5$ further forward than would be possible with a straight down tube 170. Accordingly, a longer shock absorber 28 may be accommodated by the frame assembly 162 than would be possible in a frame having a straight down tube. In the illustrated arrangement, the curved section 170A has an angle of curvature ρ of approximately 30 degrees. However, other curvature angles may also employed.

Due to the curved section 170A, the illustrated down tube 170 defines a primary axis $A_P$ and a connection axis $A_C$. The primary axis $A_P$ is defined by an intermediate section of the down tube 170 and the connection axis $A_C$ is defined by a lower section of the down tube 170 that is connected to the down tube support 206. The intermediate section defining the primary axis $A_P$ preferably extends at least one third and, more preferably, the majority of the length of the down tube 170. As shown, desirably, a projection of the primary axis $A_P$ is spaced below the crank axis $A_C$. In some arrangements, the primary axis $A_P$ may be offset below the crank axis $A_C$ by as much as 3 inches or more. Such an arrangement advantageously permits additional space to accommodate components of the bicycle frame 162, such as the shock absorber 28, for example. Desirably, the connection axis $A_C$ is also projects below the crank axis $A_C$. However, preferably, the connection axis $A_C$ passes closer to the crank axis $A_C$ than does the primary axis $A_P$. The offset of the connection axis $A_C$ also positions the lower end portion of the down tube 170 such that additional space within the frame assembly 162 is provided to accommodate components of the bicycle 160.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present bicycle frame has been described in the context of particularly preferred embodiments, the skilled artisan will appreciate, in view of the present disclosure, that certain advantages, features and aspects of the bicycle frame may be realized in a variety of other applications, many of which have been noted above. Additionally, it is contemplated that various aspects and features of the invention described can be practiced separately, combined together, or substituted for one another, and that a variety of combinations and sub-combinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A bicycle frame, comprising:
   a down tube;
   a monolithic tube support defining a lateral opening communicating with a hollow space within said down tube support and configured to receive and support a pedal crank assembly relative to said bicycle frame, said tube support defining a pocket configured to receive an end portion of said down tube such that said tube support overlaps at least a portion of a side surface of said end portion of said down tube, said pocket bounding a forward opening communicating with said hollow space; and
   a weld bead joining said tube support to said side surface of said down tube.

2. The bicycle frame of claim 1, wherein said side surface of said down tube is an outward-facing side surface.

3. The bicycle frame of claim 1, wherein said down tube support substantially closes a lower end of said down tube.

4. The bicycle frame of claim 1, wherein said down tube support overlaps an entire periphery of said end portion of said down tube.

5. The bicycle frame of claim 1, wherein said frame comprises a sub-frame and a main frame, said down tube and said tube support being components of said main frame.

6. The bicycle frame of claim 5, wherein said sub-frame comprises a pair of chain stays rotatably coupled to said main frame, a pair of seat stays rotatably coupled to said chain stays and a link rotatably coupled to said seat stays and said main frame, said sub-frame configured to carry a rear wheel.

7. The bicycle frame of claim 6, wherein said sub-frame additionally comprises a shock support configured to rotatably support one end of a shock absorber, said shock support configured for movement with said chain stays.

8. The bicycle frame of claim 1, wherein said down tube support additionally comprises a tube defining a derailleur mount surface.

9. A bicycle frame, comprising:
   a down tube having an end portion defining a non-circular cross sectional shape;
   a monolithic down tube support defining a lateral opening communicating with a hollow space within said down tube support and configured to receive and support a pedal crank assembly, said tube support defining a pocket configured to receive said end portion of said down tube, said pocket bounding a forward opening communicating with said hollow space, said pocket defining a non-circular shape that substantially corresponds to said non-circular shape of said end portion of said down tube, said pocket configured to overlap at least a portion of a side surface of said end portion; and
   a weld bead joining said tube support to said side surface of said down tube.

10. The bicycle frame of claim 9, wherein said side surface of said down tube is an outward-facing side surface.

11. The bicycle frame of claim 9, wherein said down tube support substantially closes a lower end of said down tube.

12. The bicycle frame of claim 9, wherein said down tube support overlaps an entire periphery of said end portion of said down tube.

13. The bicycle frame of claim 9, wherein said frame comprises a sub-frame and a main frame, said down tube and said tube support being components of said main frame.

14. The bicycle frame of claim 13, wherein said sub-frame comprises a pair of chain stays rotatably coupled to said main frame, a pair of seat stays rotatably coupled to said chain stays and a link rotatably coupled to said seat stays and said main frame, said sub-frame configured to carry a rear wheel.

15. The bicycle frame of claim 14, wherein said sub-frame additionally comprises a shock support configured to rotatably support one end of a shock absorber, said shock support configured for movement with said chain stays.

16. The bicycle frame of claim 9, wherein said down tube support additionally comprises a tube defining a derailleur mount surface.

17. A bicycle frame, comprising:
   a main frame comprising a down tube;
   a sub-frame movable relative to said main frame and configured to carry a rear wheel, said main frame and said sub-frame configured to operably support a shock absorber therebetween to influence relative movement of said sub-frame and said main frame;
   a monolithic down tube support defining a pocket configured to receive an end portion of said down tube such that said tube support overlaps at least a portion of a side surface of said end portion of said down tube, a lateral opening communicating with a hollow space within said down tube support and configured to receive and support a pedal crank assembly, said pocket bounding a forward opening communicating with said hollow space, wherein said tube support comprises a mount portion defining a pivot axis, said mount portion configured to support one of said sub-frame and said shock absorber for rotation about said pivot axis.

18. The bicycle frame of claim 17, wherein said side surface of said down tube is an outward-facing side surface.

19. The bicycle frame of claim 17, wherein said down tube support substantially closes a lower end of said down tube.

20. The bicycle frame of claim 17, wherein said down tube support overlaps an entire periphery of said end portion of said down tube.

21. The bicycle frame of claim 17, wherein said sub-frame comprises a pair of chain stays rotatably coupled to said main frame, a pair of seat stays rotatably coupled to said chain stays and a link rotatably coupled to said seat stays and said main frame, said sub-frame configured to carry a rear wheel.

22. The bicycle frame of claim 21, wherein said sub-frame additionally comprises a shock support configured to rotatably support one end of a shock absorber, said shock support configured for movement with said chain stays.

23. The bicycle frame of claim 17, wherein said down tube support additionally comprises a tube defining a derailleur mount surface.

24. A bicycle frame, comprising:
a down tube;
a monolithic tube support including an opening defining a crank axis and configured to receive and support a pedal crank assembly relative to said bicycle frame, said tube support defining a pocket configured to receive an end portion of said down tube such that said tube support overlaps at least a portion of a side surface of said end portion of said down tube, wherein said tube support comprises a derailleur tube extending substantially in a radial direction relative to said crank axis, said derailleur tube configured to support a front derailleur at a spaced location from said crank axis and;
a seat tube configured to receive a seat post, a lower end of said seat tube spaced above an upper end of said derailleur tube.

25. The bicycle frame of claim 24, wherein said side surface of said down tube is an outward-facing side surface.

26. The bicycle frame of claim 24, wherein said down tube support substantially closes a lower end of said down tube.

27. The bicycle frame of claim 24, wherein said down tube support overlaps an entire periphery of said end portion of said down tube.

28. The bicycle frame of claim 24, wherein said frame comprises a sub-frame and a main frame, said down tube and said tube support being components of said main frame.

29. The bicycle frame of claim 28, wherein said sub-frame comprises a pair of chain stays rotatably coupled to said main frame, a pair of seat stays rotatably coupled to said chain stays and a link rotatably coupled to said seat stays and said main frame, said sub-frame configured to carry a rear wheel.

30. The bicycle frame of claim 29, wherein said sub-frame additionally comprises a shock support configured to rotatably support one end of a shock absorber, said shock support configured for movement with said chain stays.

31. A bicycle frame, comprising:
a down tube;
a monolithic down tube support defining a surface configured to abut an end surface of said down tube, said surface bounding a forward opening communicating with a hollow space within said down tube support, said down tube support defining a lateral opening communicating with said hollow space and configured to receive and support a pedal crank assembly, said down tube support additionally comprising a locator surface configured to contact a side surface of said down tube to locate said down tube relative to said down tube support; and
a weld bead joining said down tube and said down tube support.

32. The bicycle frame of claim 31, wherein said side surface is an outward-facing surface of said down tube.

33. A bicycle frame, comprising:
a down tube;
a monolithic down tube support defining a surface configured to abut an end surface of said down tube, said surface bounding a forward opening communicating with a hollow space within said down tube support, said down tube support defining a lateral opening communicating with said hollow space and configured to receive and support a pedal crank assembly, wherein said down tube support is configured to substantially close off an open end of said down tube when said pedal crank assembly is received within said opening.

34. The bicycle frame of claim 33, wherein said frame comprises a main frame, a sub-frame and a shock absorber operably connected between said main frame and said sub-frame, wherein one end of said shock absorber is connected to a portion of said main frame other than said down tube support.

35. The bicycle frame of claim 33, wherein said down tube support is manufactured by a process including a forging step.

36. A bicycle frame, comprising:
a main frame including a down tube, an intermediate portion of said down tube defining a primary down tube axis extending along a length of said intermediate portion of said down tube;
a sub-frame movable relative to said main frame, said main frame and said sub-frame configured to operably support a shock absorber therebetween, said shock absorber defining a shock absorber axis extending along a length of said shock absorber, said shock absorber axis being nonparallel to said down tube axis, said shock absorber having one end pivotally connected to said down tube;
a monolithic down tube support defining a surface configured to abut an end surface of said down tube, said down tube support including a lateral opening configured to receive and support a pedal crank assembly for rotation about a crank axis, wherein said down tube includes a curved section between an end portion of said down tube that abuts said down tube support and said intermediate portion of said down tube such that said primary axis of said down tube is offset from said crank axis.

37. The bicycle frame of claim 36, wherein said down tube support is manufactured by a process including a forging step.

38. A bicycle frame, comprising:
a down tube;
a monolithic down tube support defining a surface configured to abut an end surface of said down tube, said surface bounding a forward opening communicating with a hollow space within said down tube support, said down tube support defining a lateral opening communicating with said hollow space and configured to receive and support a pedal crank assembly;
wherein a portion of said down tube abutting said down tube support defines a connection axis and defines a height between an upper surface and a lower surface, said down tube support including a lateral opening configured to receive and support a pedal crank assembly for rotation about a crank axis, said connection axis being spaced below said crank axis, and wherein said height of said down tube is greater than a diameter of said lateral opening.

39. A bicycle frame, comprising:
a down tube;
a monolithic down tube support defining a surface configured to abut an end surface of said down tube;
wherein a portion of said down tube that abuts said down tube support defines a connection axis and further defines a height between an upper surface and a lower surface, said down tube support including a lateral opening configured to receive and support a pedal crank assembly for rotation about a crank axis, and wherein said height of said down tube is greater than a diameter of said opening;
wherein said down tube includes a curved section near said down tube support and between said portion abutting said down tube support and an intermediate section of said down tube, wherein said intermediate section of said down tube defines a primary axis of said down tube, said primary axis defining an angle with said connection axis.

40. The bicycle frame of claim 39, wherein said primary axis is spaced below said crank axis.

41. The bicycle frame of claim 39, wherein an entirety of said end surface of said down tube abuts said down tube support.

42. The bicycle frame of claim 39, wherein said frame comprises a main frame, a sub-frame and a shock absorber operably connected between said main frame and said sub-frame, wherein one end of said shock absorber is connected to a portion of said main frame other than said down tube support.

43. The bicycle frame of claim 39, wherein said down tube support is manufactured by a process including a forging step.

* * * * *